(12) United States Patent
Yin et al.

(10) Patent No.: US 12,545,605 B2
(45) Date of Patent: Feb. 10, 2026

(54) "SUPER-BUBBLE" ELECTRO-PHOTO HYBRID CATALYTIC SYSTEM FOR ADVANCED TREATMENT OF ORGANIC WASTEWATER

(71) Applicant: California Institute of Technology, Pasadena, CA (US)

(72) Inventors: Lifeng Yin, Pasadena, CA (US); Alan Yalun Gu, Pasadena, CA (US); Michael R Hoffmann, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 1036 days.

(21) Appl. No.: 17/549,693

(22) Filed: Dec. 13, 2021

(65) Prior Publication Data

US 2022/0227645 A1    Jul. 21, 2022

Related U.S. Application Data

(60) Provisional application No. 63/125,139, filed on Dec. 14, 2020.

(51) Int. Cl.
    *C02F 1/72*     (2023.01)
    *B01J 35/39*    (2024.01)
    *C02F 1/461*    (2023.01)

(52) U.S. Cl.
    CPC .............. *C02F 1/725* (2013.01); *B01J 35/39* (2024.01); *C02F 1/46109* (2013.01); *C02F 2001/46142* (2013.01)

(58) Field of Classification Search
    CPC ...... C02F 1/72; C02F 1/70; C02F 1/46; C02F 1/44; C02F 1/40; C02F 1/32; C02F 1/36;
    (Continued)

(56) References Cited

U.S. PATENT DOCUMENTS 2,967,807  A    1/1961  Osborne et al.
3,761,383  A    9/1973  Backhurst et al.
(Continued)

FOREIGN PATENT DOCUMENTS

CN    102596823  A  *  7/2012  .............. C02F 1/325
CN    102603037        7/2012
(Continued)

OTHER PUBLICATIONS

CN-102596823-A Translation (Year: 2012).*
(Continued)

*Primary Examiner* — Hayden Brewster
(74) *Attorney, Agent, or Firm* — Leydig, Voit & Mayer, Ltd.

(57) ABSTRACT

The systems and methods for wastewater treatment comprise a porous substrate with photocatalytic material(s), and optionally electrocatalytic material(s), for generation of hydroxyl radicals that decompose contaminants in wastewater. The systems and methods intentionally facilitate the photocatalytic and/or electrocatalytic generation of oxygen bubbles, which facilitate an increase in concentration of hydroxyl radicals and shrink the liquid layer of wastewater at photocatalytic and/or electrocatalytic surfaces where hydroxyl radicals are generated in order to decrease quenching of hydroxyl radicals and simultaneously increase utilization or efficiency of the hydroxyl radicals for decomposition of contaminants. In embodiments, the systems and methods prolong hydroxyl radical lifetime and enhance water treatment performance for residential, commercial, municipal, medical, and/or industrial applications. In embodiments, oxygen bubbles generated on surfaces are compressed into pores or microchannels where they store generated hydroxyl radicals to prolong their lifetime in the
(Continued)

gas phase and exchange hydroxyl radicals with the adjacent liquid layer.

27 Claims, 16 Drawing Sheets

(58) Field of Classification Search
CPC ............... C02F 1/725; C02F 1/46109; C02F 2001/46142; C02F 2001/46147; C02F 2001/46157; C02F 2101/30; C02F 2305/023; C02F 2305/10; B01J 35/00; B01J 35/39
USPC .................................................. 210/748.14
See application file for complete search history.

(56) References Cited

U.S. PATENT DOCUMENTS

| | | | |
|---|---|---|---|
| 5,364,509 | A | 11/1994 | Dietrich |
| 6,527,939 | B1 | 3/2003 | Hardee et al. |
| 10,059,607 | B2 | 8/2018 | Hoffman et al. |
| 10,259,726 | B2 | 4/2019 | Fraim et al. |
| 10,266,429 | B2 | 4/2019 | Legzdins |
| 2001/0042682 | A1 | 11/2001 | Weres et al. |
| 2002/0050451 | A1 | 5/2002 | Ford et al. |
| 2005/0211553 | A1 | 9/2005 | Mojana et al. |
| 2005/0211641 | A1 | 9/2005 | Butters et al. |
| 2006/0223700 | A1 | 10/2006 | Jung et al. |
| 2007/0000774 | A1 | 1/2007 | Weres |
| 2010/0044219 | A1 | 2/2010 | Carlson et al. |
| 2011/0180423 | A1 | 7/2011 | Barry et al. |
| 2012/0064435 | A1 | 3/2012 | Maruyama et al. |
| 2012/0090988 | A1 | 4/2012 | Li et al. |
| 2012/0279872 | A1* | 11/2012 | Chen ................. C02F 1/325 204/291 |
| 2013/0112548 | A1 | 5/2013 | Hermann et al. |
| 2014/0209479 | A1 | 7/2014 | Hoffmann et al. |
| 2015/0354072 | A1 | 12/2015 | Suchsland et al. |
| 2016/0009574 | A1 | 1/2016 | Hoffmann et al. |
| 2016/0332902 | A1 | 11/2016 | Barry et al. |
| 2017/0152163 | A1 | 6/2017 | Chaplin et al. |
| 2017/0334751 | A1 | 11/2017 | Zhang et al. |
| 2018/0057952 | A1 | 3/2018 | Hoffman et al. |
| 2018/0222781 | A1 | 8/2018 | Liu et al. |
| 2019/0112211 | A1 | 4/2019 | Cao et al. |
| 2019/0185351 | A1 | 6/2019 | Huang et al. |
| 2019/0284066 | A1 | 9/2019 | Mullen et al. |
| 2019/0345044 | A1 | 11/2019 | Zhang et al. |
| 2020/0407248 | A1 | 12/2020 | Yang et al. |

FOREIGN PATENT DOCUMENTS

| | | |
|---|---|---|
| CN | 102923826 | 2/2013 |
| CN | 105903358 | 8/2016 |
| CN | 107930414 | 4/2018 |
| EP | 0014596 | 8/1980 |
| GB | 1194181 A | 6/1970 |
| JP | 58-136790 | 8/1983 |
| WO | 2009/154753 | 12/2009 |
| WO | 2013/154623 | 10/2013 |
| WO | 2016/007198 | 1/2016 |
| WO | 2016/028231 A1 | 2/2016 |
| WO | 2020/264112 | 12/2020 |
| WO | 2022/132662 | 6/2022 |

OTHER PUBLICATIONS

U.S. Appl. No. 16/911,912, filed Jun. 25, 2020.
Bagheri et al. (2014) "Cobalt Doped Titanium Dioxide Nanoparticles: Synthesis, Characterization and Electrocatalytic Study," Journal of the Chinese Chemical Society, vol. 61, Issue 6, 702-706.
Dargahi et al. (Nov. 2018) "Electrodegradation of 2,4-dichlorophenoxyacetic acid herbicide from aqueous solution using three dimensional electrode reactor with G/b-PbO2 anode: Taguchi optimization and degradation mechanism determination," RSC Adv 8, (69), 39256-39268.
Extended European Search Report dated Mar. 23, 2020 in European application No. EP17844302, 7 pp.
Felix et al. (2012) "Synthesis, Characterization, and Evaluation of IrO2 Based Binary Metal Oxide Electrocatalysts for Oxygen Evolution Reaction", International Journal of Electrochemical Science, 7, 12064-12077.
Furukawa et al. (2014) "Water Adsorption in Porous Metal-Organic Frameworks and Related Materials," J. Am. Chem. Soc. 136 (11), 4369-4381.
Higley (1976) "Lead dioxide-plated titanium anode for electrowinning metals from acid solutions," Rolla, MO: U.S. Department of the Interior, Bureau of Mines, RI 8111, Jan. 1976:1-10.
Huang et al. (2016) "Electrochemical disinfection of toilet wastewater using wastewater electrolysis cell," Water Research 92:164-172. https://doi.org/10.1016/j.watres.2016.01.040.
International Search Report and Written Opinion, PCT/US2015/013193, Korean Intellectual Property Office, dated May 7, 2015.
International Preliminary Report on Patentability and Written Opinion, PCT/US2015/013193, The International Bureau of WIPO, dated Jan. 10, 2017.
International Preliminary Report on Patentability and Written Opinion dated Feb. 26, 2019 in International application No. PCT/US2017/048066, 10 pp.
International Search Report and Written Opinion dated Apr. 29, 2022 in corresponding International Application No. PCT/US2021/063143, 11 pp.
International Search Report and Written Opinion mailed Dec. 29, 2017 in International application No. PCT/US2017/048066, 13 pp.
International Search Report and Written Opinion mailed Nov. 17, 2020 in corresponding International Application No. PCT/US2020/039553, 11 pp.
Jasper et al. (2016) "Electrochemical Transformation of Trace Organic Contaminants in Latrine Wastewater," Environ. Sci. Technol. 50 (18), 10198-10208.
Jing et al. (Nov. 2018) "The roles of oxygen vacancies, electrolyte composition, lattice structure, and doping density on the electrochemical reactivity of Magnéli phase $TiO_2$ anodes," J. Mater. Chem. A 6:23828-23839. https://doi.org/10.1039/C8TA03719A.
Kapałka et al. (2009) "The importance of electrode material in environmental electrochemistry: Formation and reactivity of free hydroxyl radicals on boron- doped diamond electrodes," Electrochimica Acta 54, 2018-2023.
Li et al. (2016) "Electrochemical degradation of pyridine by $Ti/SnO_2$—Sb tubular porous electrode," Chemosphere 149:49-56. https://doi.org/10.1016/j.chemosphere.2016.01.078.
Lin et al. (1996) "The properties of antimony-doped tin oxide thin films from the sol-gel process", Surface and Coatings Technology, vol. 88, issues 1-3, 239-247.
Lin et al. (Dec. 2018) "Development of macroporous Magnéli phase $Ti_4O_7$ ceramic materials: As an efficient anode for mineralization of poly- and perfluoroalkyl substances," Chem. Eng. J. 354:1058-1067. https://doi.org/10.1016/j.cej.2018.07.210.
Martínez-Huitle et al. (2011) "Electrocatalysis in wastewater treatment: recent mechanism advances," Quím. Nova vol. 34 No. 5, 850-858.
McDowell et al. (2005) "Ozonation of Carbamazepine in Drinking Water: Identification and Kinetic Study of Major Oxidation Products," Environ. Sci. Technol. 39 (20), 8014-8022.
Menzel et al. (2013) "Dimensionally Stable $Ru/Ir/TiO_2$-Anodes with Tailored Mesoporosity for Efficient Electrochemical Chlorine Evolution," ACS Catal. 3, 1324-1333.
Moradi et al. (2014) "Addition of $IrO_2$ to $RuO_2+TiO_2$ coated a+nodes and its effect on electrochemical performance of anodes in acid media," Progress in Natural Science: Materials International 24, 134-141.
Moreno-Hernandez et al. (Mar. 2019) Crystalline nickel, cobalt, and manganese antimonates as electrocatalysts for the chlorine evolution reaction. Energy Environ. Sci. 12:1241-1248. https://doi.org/10.1039/C8EE03676D.

(56) References Cited

OTHER PUBLICATIONS

Niu et al. (2012) "Electrochemical Mineralization of Perfluorocarboxylic Acids (PFCAs) by Ce-Doped Modified Porous Nanocrystalline PbO2 Film Electrode," Environ. Sci. Technol. 46, (18), 10191-10198.

Oh et al. (2015) "Long-term stability of hydrogen nanobubble fuel," Fuel 158, 399-404. 10.1016/j.fuel.2015.05.072.

Samarghandi et al. (Sep. 2018) "Electrochemical process for 2,4-D herbicide removal from aqueous solutions using stainless steel 316 and graphite Anodes: optimization using response surface methodology," Sep. Sci. Technol. 54, (4), 478-493.

Trellu et al. (Oct. 2018) "Electro-oxidation of organic pollutants by reactive electrochemical membranes," Chemosphere 208:159-175. https://doi.org/10.1016/j.chemosphere.2018.05.026.

Wang et al. (2009) "SnO2 Nanostructures-TiO2 Nanofibers Heterostructures: Controlled Fabrication and High Photocatalytic Properties", Inorganic Chemistry, 48, 15, 7261-7268.

Wang et al. (2016) "Applications of Water Stable Metal-Organic Frameworks," Chemical Society Reviews 45 (18), 5107-5134.

Xu et al. (2003) "A Study on the Deactivation of an $IrO_2$-$Ta_2O_5$ Coated Titanium Anode," Corrosion Science 45(12):2729-2740.

Xu et al. (Feb. 2020) "Antimony Doped Tin Oxide Nanoparticles Deposited onto Nb—TiO2 Nanotubes for Electrochemical Degradation of Bio-refractory Pollutions," Electroanalysis 32, 1370-1378.

Yang et al. (2014) "Shift of the Reactive Species in the Sb—$SnO_2$-Electrocatalyzed Inactivation of *E. coli* and Degradation of Phenol: Effects of Nickel Doping and Electrolytes," Environ. Sci. Technol. 48:2877-2884. https://doi.org/10.1021/es404688z.

Yang et al. (2016) "Multilayer Heterojunction Anodes for Saline Wastewater treatment: Design Strategies and Reactive Species Generation Mechanisms," Environ. Sci. Technol. 50:8780-8787.

Yang et al. (Apr. 2018) "A reactive electrochemical filter system with an excellent penetration flux porous Ti/$SnO_2$—Sb filter for efficient contaminant removal from water," RSC Adv. 8:13933-13944. https://doi.org/10.1039/C8RA00603B.

Yi et al. (2007) "Effect of $IrO_2$ loading on $RuO_2$—$IrO_2$—$TiO_2$ anodes: A study of microstructure and working life for the chlorine evolution reaction," Ceramics International 33(6):1087-1091.

Yu et al. (Apr. 2020) "Reactive Oxygen Species and Catalytic Active Sites in Heterogeneous Catalytic Ozonation for Water Purification," Environ. Sci. Technol. 54(10):5931-5946.

Zaky et al. (2013) "Porous Substoichiometric $TiO_2$ Anodes as Reactive Electrochemical Membranes for Water Treatment," Environ. Sci. Technol. 47:6554-6563. https://doi.org/10.1021/es401287e.

Zaky et al. (2014) "Mechanism of p-Substituted Phenol Oxidation at a $Ti_4O_7$ Reactive Electrochemical Membrane," Environ. Sci. Technol. 48:5857-5867. https://doi.org/10.1021/es5010472.

Zhou et al. (Mar. 2019) "High-efficiency electrochemical degradation of antiviral drug abacavir using a penetration flux porous Ti/$SnO_2$—Sb anode," Chemosphere 225:304-310. https://doi.org/10.1016/j.chemosphere.2019.03.036.

\* cited by examiner

"SUPER-BUBBLE" ELECTRO-PHOTO HYBRID CATALYTIC SYSTEM FOR ADVANCED TREATMENT OF ORGANIC WASTEWATER

CROSS-REFERENCE TO RELATED APPLICATIONS

This application claims the benefit of priority to U.S. Provisional Patent Application No. 63/125,139, filed Dec. 14, 2020, which is hereby incorporated by reference in its entirety.

BACKGROUND OF INVENTION

Advanced Oxidization Process (AOP) is an advanced wastewater treatment technology mainly used to treat refractory wastewater, including high-pollutant-concentration and high-salt domestic wastewater as well as wastewater from chemical industry, textile, dyeing, oil refining, tanning, aquaculture, agricultural, animal husbandry, landfill leachate, and osmosis concentrated water, etc. Most of the pollutants in these wastewaters are of poor biodegradability, meaning they can only be treated by controlled AOP technology.

AOP is different from the chlorine evolution reaction (CER, as described in, for example, US20140209479A1, "Self-contained, pv-powered domestic toilet and wastewater treatment system", by Michael R. Hoffmann et al.) or hydrogen peroxide ($H_2O_2$) evolution reaction (US20180222781, "Water purification using porous carbon electrode", by Kai Liu and Michael R. Hoffmann). Both homogeneous AOP (e.g. Fenton, UV/$H_2O_2$, UV/$O_3$, etc.) and heterogeneous AOP (e.g., photocatalysis, electrocatalysis) are based on the evolution of hydroxyl radicals (.OH). The standard oxidation potential of hydroxyl radicals are as high as 2.8 V, much higher than that of free chlorine (1.36 V) and hydrogen peroxide (1.78 V). Hydroxyl radicals attack and destroy organic pollutants in the wastewater, quickly mineralizing them into carbon dioxide ($CO_2$) and water ($H_2O$). AOP is currently the most effective wastewater oxidation treatment technology. However, most of the present AOP technologies in the world are only effective for low (COD) concentration of wastewater. For some organic wastewater, especially when the concentration of pollutants exceeds 1000 $mgL^{-1}$, the efficiency of the present AOP technologies drops off quickly, the energy efficiency decreases rapidly, and the demand of the oxidant dosage rises rapidly, resulting the AOP technologies to be uneconomical at those high pollutant concentrations.

Previous research found that the key bottleneck that makes AOP technology difficult to treat high-concentration organic wastewater is that the hydroxyl radicals are a an oxidant with strong redox capability but short lifetime ($10^{-10}$~$10^{-9}$ s) in aqueous solutions. During electrocatalysis, for example, the hydroxyl radicals are readily quenched beyond the diffusion layer only tens or hundreds of nanometers from the electrode surface. A direct result of this fast quenching of hydroxyl radicals is the low apparent efficiency of AOP processes—typically less than 1% on the degradation of pollutants—causing a lot of waste of energy (electric energy and/or optical energy) or chemicals ($H_2O_2$, $FeSO_4$, or $O_3$).

Electrocatalysis may involve a series of electrode reactions and resulting chemical, electrochemical, or physical processes to decompose or otherwise transform pollutants. Electrochemical reactors are generally relatively simple with low operation and maintenance costs. Electrocatalysis is convenient for industrial automation and is sometimes referred to as an "environment-friendly" technology.

A traditional electrocatalysis reactor has of one or more pairs of two-dimensional flat electrodes (anodes and cathodes). The effective electrode area of such reactor is very small, and the mass transfer can be problematic. In a wastewater treatment process, a fast electrode reaction rate is required, and more efficient electrocatalytic reactors need to be developed. Backnurst et al. (U.S. Pat. No. 3,761,383A) proposed the design of a fluidized bed electrode (FBE). This electrode is different from the flat electrode and has a certain three-dimensional configuration. The specific surface area is tens or even hundreds of times that of the flat electrodes. The electrolyte flows in the pores and the mass transfer process in the electrochemical reactor is improved in the case of FBE. Further, M. Fleischmamm and F. Goodridge have successfully developed the bipolar fixed bed electrode (BPBE). The internal electrode material is repolarized under the action of a high gradient electric field to form "bipolar particles". The oxidation-reduction reactions occur at the two ends of the small particles, each of which is equivalent to a micro-electrochemical cell. Because the entire electrochemical cell is equivalent to the composition of numerous micro-electrochemical cells in series, the efficiency is improved.

The fluidized bed electrode (FBE) and the three-dimensional electrode (BPBE) increase the contact area between the electrode and the wastewater, and enhance the mass transfer efficiency. However, in the presence of an electric field, not every polar particle surface can carry an equal amount of charges. Therefore, the efficiency of oxidation in such reactor is limited. Also, the highest efficiencies of oxidation and reduction occur near the electro-contactor area because the "bipolar particles" are of poor electrical conductivity both for the fluidized bed electrode (FBE) and the bipolar fixed bed electrode (BPBE). On the other hand, the diffusion layer of hydroxyl radicals generated on the surface of electrocatalysts is not thickened by the increase of the electrode surface area. Therefore, the apparent efficiency of hydroxyl radicals is improved considerably by FBE and BPBE.

SUMMARY OF THE INVENTION

Provided herein are methods and systems for wastewater treatment that address the above and other challenges in the art, such as the short lifetime of hydroxyl radicals in aqueous media that in turn result in low energy efficiency and limited treatment effectiveness, especially at high pollutant concentrations. In embodiments, the systems, and methods, disclosed herein include an electro-photo composite catalytic reaction system to prolong hydroxyl radical lifetime and enhance water treatment performance. The systems, and methods, disclosed herein comprise a porous substrate with photocatalytic materials, and optionally electrocatalytic materials, for generation of hydroxyl radicals that in turn decompose contaminants in wastewater. The systems and methods disclosed herein intentionally facilitate the electrocatalytic and/or photocatalytic generation of oxygen bubbles which facilitate both an increase in concentration of hydroxyl radicals and shrink the liquid layer of wastewater at electrocatalytic and/or photocatalytic surfaces where hydroxyl radicals are generated in order to decrease quenching of hydroxyl radicals and increase utilization or efficiency of the hydroxyl radicals for decomposition of contaminants. In embodiments, oxygen bubbles generated on electrode surfaces are compressed into channels by hydrostatic pressure, where they capture generated hydroxyl radicals to prolong their lifetime in the gas phase. In embodiments, photocatalysts at the exit of the channels generate additional hydroxyl radicals using energy supplied by an UV-lamp, replenishing hydroxyl radicals in the gaseous bubbles. In embodiments, ozone under the UV-light excitation may generate additional hydroxyl radicals in the gaseous bubbles. In embodiments, this prolonged lifetime (>1 s vs $10^{-10}$~$10^{-9}$ s in aqueous media) of hydroxyl radicals lead to improved water treatment performance from a wide range of household and industrial sources.

Aspects disclosed herein include a wastewater treatment system comprising: a porous substrate having a first external surface, a second external surface opposite the first external surface, and an internal porous region between the first external surface and the second external surface; an electrocatalytic material immobilized on at least a portion of the first external surface and/or in at least a portion of the internal porous region; a photocatalytic material immobilized on at least a portion of the second external surface and/or in at least a portion of the internal porous region; and a wastewater flowing between the first external surface and the second external surface through the internal porous region; wherein: the wastewater is in contact with the electrocatalytic material and the photocatalytic material; the electrocatalytic material is subject to an anodic bias sufficient to electrocatalytically generate hydroxyl radicals at the electrocatalytic material; at least a portion of the photocatalytic material is exposed to a light sufficient to photocatalytically generate hydroxyl radicals at the photocatalytic material; the wastewater flowing in the internal porous region comprises oxygen bubbles oxygen bubbles and at least a portion of the generated hydroxyl radicals; and a concentration of contaminants in the wastewater is decreased at least via an interaction between the contaminants and the hydroxyl radicals. Optionally, at least a portion of the oxygen bubbles in the wastewater flowing in the internal porous regions is oxygen bubbles generated in the system.

Aspects disclosed herein include a wastewater treatment system comprising: a porous substrate having a first external surface, a second external surface, and an internal porous region between the first external surface and the second external surface; (optionally) an electrocatalytic material immobilized on at least a portion of the first external surface and/or in at least a portion of the internal porous region; a photocatalytic material immobilized on at least a portion of the second external surface and/or in at least a portion of the internal porous region; and a wastewater flowing between the first external surface and the second external surface through the internal porous region; wherein: the wastewater is in contact with (i) (optionally) the electrocatalytic material and (ii) the photocatalytic material; (optionally)the electrocatalytic material is subject to an anodic bias sufficient to generate hydroxyl radicals at the electrocatalytic material; at least a portion of the photocatalytic material is exposed to a light sufficient to generate hydroxyl radicals at the photocatalytic material; the wastewater flowing in the internal porous region comprises at least a fraction of the generated oxygen bubbles and at least a portion of the generated hydroxyl radicals; and a concentration of contaminants in the wastewater is decreased at least via an interaction between the contaminants and the hydroxyl radicals. Optionally, at least a portion of the oxygen bubbles in the wastewater flowing in the internal porous regions is oxygen bubbles generated in the system.

Aspects disclosed herein include a wastewater treatment system comprising: a porous substrate having a first external surface, a second external surface, and an internal porous region between the first external surface and the second external surface; an electrocatalytic material immobilized on at least a portion of the first external surface and/or in at least a portion of the internal porous region; (optionally) a photocatalytic material immobilized on at least a portion of the second external surface and/or in at least a portion of the internal porous region; and a wastewater flowing between the first external surface and the second external surface through the internal porous region; wherein: the wastewater is in contact with (i) the electrocatalytic material and (ii) (optionally) the photocatalytic material; the electrocatalytic material is subject to an anodic bias sufficient to generate hydroxyl radicals at the electrocatalytic material; (optionally) at least a portion of the photocatalytic material is exposed to a light sufficient to generate hydroxyl radicals at the photocatalytic material; the wastewater flowing in the internal porous region comprises at least a fraction of the generated oxygen bubbles and at least a portion of the generated hydroxyl radicals; and a concentration of contaminants in the wastewater is decreased at least via an interaction between the contaminants and the hydroxyl radicals. Optionally, at least a portion of the oxygen bubbles in the wastewater flowing in the internal porous regions is oxygen bubbles generated in the system.

Optionally in any embodiment of methods and systems herein, internal porous region may be characterized as having open-cell pore structure or open-cell foam structure such that microchannels exists through the internal porous region between the first and second external surfaces. Optionally in any embodiment of methods and systems herein, the internal porous region comprises by large-small-large pore size distribution. Optionally in any embodiment of methods and systems herein, the internal porous region comprises: a first internal region nearest to the first external surface, a second internal region nearest to the second external surface, and a middle internal region between the first and second internal regions; and wherein the middle internal region is characterized by a different average pore size relative to an average pore size in each of the first internal region and the second internal region. Optionally in any embodiment of methods and systems herein, the internal porous region is characterized by a non-linear pore size distribution; wherein an average pore size in the middle internal region is less than an average pore size in each of the first internal region and the second internal region. Optionally in any embodiment of methods and systems herein, the average pore size or characteristic pore diameter in the first internal region is selected from the range of 20 μm to 50 μm (or any value or range therebetween, inclusively, is contemplated and useful), the average pore size or characteristic pore diameter in the middle internal region is selected from the range of 20 μm to 1 μm (or any value or range therebetween, inclusively, is contemplated and useful), and the average pore size or characteristic pore diameter in the second internal region is selected from the range of 20 μm to 50 μm (or any value or range therebetween, inclusively, is contemplated and useful). Optionally in any embodiment of methods and systems herein, the average pore size or characteristic pore diameter in each of the first internal region and the second internal region is selected from the range of 15 μm to 100 μm, 15 μm to 60 μm, optionally 15 μm to 45 μm, optionally 20 μm to 45 μm, optionally 15 μm to 60 μm. Optionally in any embodiment of methods and systems herein, the average pore size or characteristic pore diameter in the middle internal region is selected from the range of 25 µm to 0.5 µm, optionally 25 µm to 1 µm, optionally 20 µm to 0.5 µm, optionally 15 µm to 1 µm, optionally 15 µm to 0.5 µm, optionally 10 µm to 0.5 µm, optionally 10 µm to 1 µm. Optionally in any embodiment of methods and systems herein, the average pore size or characteristic pore diameter in the internal porous region is selected from the range of 100 µm to 1 µm, optionally 80 µm to 1 µm, optionally 60 µm to 1 µm, optionally 50 µm to 1 µm, optionally 40 µm to 1 µm, optionally 30 µm to 1 µm. Optionally in any embodiment of methods and systems herein, at least 25%, preferably at least 50%, optionally at least 60%, optionally at least 70%, optionally at least 80%, optionally at least 90%, of the total surface area of the internal porous region comprises the electrocatalytic material and/or the photocatalytic material operably immobilized thereon.

Optionally in any embodiment of methods and systems herein, the electrocatalytic material is in electrical communication with the porous substrate. Optionally in any embodiment of methods and systems herein, at least a portion of the electrocatalytic material is subject to the anodic bias selected from the range of 1.8 V to 4.5 V vs. Ag/AgCl, optionally 2.2 to 2.6 V vs Ag/AgCl. Optionally in any embodiment of methods and systems herein, the porous substrate is an anode and the system further comprises a cathode; and wherein the system comprises an overall potential between the anode and the cathode selected from the range of 3 V to 12 V. Optionally in any embodiment of methods and systems herein, the electrocatalytic material is characterized by an oxygen evolution potential (OEP) being selected from the range of 1.6 to 2.3 V vs. SHE. Optionally in any embodiment of methods and systems herein, the electrocatalytic material comprises Pt, $PbO_2$, boron-doped diamond, or a combination of these.

Optionally in any embodiment of methods and systems herein, the photocatalytic material comprises titanium dioxide, ZnO, $Bi_2O_3$, $Cu_2O$, $SrTiO_3$, any variation of these having oxygen vacancies and/or dopant(s), or any combination of these. Optionally in any embodiment of methods and systems herein, the photocatalytic material is nanostructured. A nanostructured material, for example, may be in the form of or comprise structures such as, but not limited to, nanotubes, nanocylinders, nanowires, nanorods, nanosheets, nanoribbons, nanoflakes, nanoparticles, any variation of these, and any combination of these. Optionally in any embodiment of methods and systems herein, the photocatalytic material comprises titanium dioxide nanotube arrays. Optionally in any embodiment of methods and systems herein, the light comprises ultraviolet light. Optionally in any embodiment of methods and systems herein, the photocatalytic material is characterized by a band gap selected from the range of 2.4 to 6.7 eV.

Optionally in any embodiment of methods and systems herein, the oxygen bubbles are generated at the electrocatalytic and/or photocatalytic material, respectively. Optionally in any embodiment of methods and systems herein, the oxygen bubbles are electrocatalytically and/or photocatalytically generated at the electrocatalytic and/or photocatalytic material, respectively. Optionally in any embodiment of methods and systems herein, oxygen bubbles flowing within the internal porous region are characterized by an average characteristic size (such as average characteristic diameter) selected from the range of 0.1 µm to 10 µm. Optionally in any embodiment of methods and systems herein, oxygen bubbles flowing within the internal porous region are characterized by an average characteristic size (such as average characteristic diameter) selected from the range of 0.05 µm to 10 µm, optionally 0.05 µm to 8 µm, optionally 0.05 µm to 6 µm, optionally 0.1 µm to 8 µm, optionally 0.1 µm to 6 µm, optionally 0.05 µm to 5 µm, optionally 0.1 µm to 5 µm, optionally 0.05 µm to 3 µm, optionally 0.1 µm to 3 µm. Optionally in any embodiment of methods and systems herein, a majority of oxygen bubbles generated at the first external surface and/or within the internal porous region pass through the internal porous region intact. Optionally in any embodiment of methods and systems herein, the oxygen bubbles within the internal porous region comprise hydroxyl radicals within each bubble's gas-phase. Optionally in any embodiment of methods and systems herein, the oxygen bubbles flow through pores of the internal porous region thereby confining a liquid layer adjacent to a nearest pore surface to a thickness of less than 3 µm, optionally less than 1 µm, optionally less than 2 µm, optionally less than 0.8 µm, optionally less than 0.5 µm. Optionally in any embodiment of methods and systems herein, a liquid layer between each oxygen bubble flowing within the internal porous region and a nearest surface of the internal porous region has thickness of less than 3 µm, optionally less than 1 µm, optionally less than 2 µm, optionally less than 0.8 µm, optionally less than 0.5 µm. Optionally in any embodiment of methods and systems herein, a majority of an internal pore volume of the porous internal region comprises generated oxygen bubbles (or, gaseous oxygen) during operation of the method or system. Optionally in any embodiment of methods and systems herein, at least a fraction of (e.g., at least 25%; e.g., at least 50%) the oxygen bubbles generated outside the porous internal region are indrafted into the porous internal region. Optionally in any embodiment of methods and systems herein, a majority of oxygen bubbles that are generated within or that enter the internal porous region remain intact when within the internal porous region. Indrafting may refer to bubbles flowing into the porous internal structure from outside the porous internal region (e.g., from first or second external surface) and/or flowing further into or through the porous internal region. Optionally in any embodiment of methods and systems herein, at least a fraction of oxygen bubbles generated outside the internal porous region are indrafted into the internal porous region. Optionally in any embodiment of methods and systems herein, the generated oxygen bubbles compress within the porous internal region, such as when flowing from large pores to relatively smaller pores. Optionally in any embodiment of methods and systems herein, the generated oxygen bubbles swell within the porous internal region, such as when flowing from small pores to relatively larger pores. Optionally in any embodiment of methods and systems herein, hydroxyl radicals are exchanged between a gas phase of oxygen bubbles and the liquid wastewater throughout the internal porous region. Optionally in any embodiment of methods and systems herein, hydroxyl radicals are exchanged from a gas phase of oxygen bubbles to the liquid wastewater and from the liquid wastewater to the gas phase of oxygen bubbles throughout the internal porous region. Optionally in any embodiment of methods and systems herein, wherein oxygen bubbles within the internal porous region compress when flowing from pores nearer to the first or second external surface to pores in a middle region of the internal porous region. Optionally in any embodiment of methods and systems herein, oxygen bubbles within the internal porous region swell when flowing from pores in a middle region of the internal porous region to pores nearer to the first or second external surface.

Optionally in any embodiment of methods and systems herein, the flowrate of the wastewater near the first external surface, in the internal porous region, and/or near the second external surface is selected from the range of $2.6 \times 10^{-5}$ m/s to $1.1 \times 10^{-3}$ m/s. Optionally in any embodiment of methods and systems herein, the flowrate of the wastewater in the system is selected from the range of $2.6 \times 10^{-5}$ m/s to $1.1 \times 10^{-3}$ m/s. Optionally in any embodiment of methods and systems herein, the flowrate of the wastewater in the system, such as near the first external surface, in the internal porous region, and/or near the second external surface, is selected from the range of $1 \times 10^{-5}$ m/s to $1 \times 10^{-1}$ m/s, optionally $1 \times 10^{-5}$ m/s to $1 \times 10^{-2}$ m/s, optionally $1 \times 10^{-5}$ m/s to $1 \times 10^{-3}$ m/s, optionally $1 \times 10^{-5}$ m/s to $5 \times 10^{-3}$ m/s, optionally $2 \times 10^{-5}$ m/s to $1 \times 10^{-2}$ m/s, optionally $2 \times 10^{-5}$ m/s to $5 \times 10^{-3}$ m/s. Optionally in any embodiment of methods and systems herein, the wastewater is characterized by a fluid pressure difference between the first external surface and the second external surface selected from the range of 5.2 Pa to 83 Pa and/or wherein the wastewater is characterized by a fluid pressure (i.e., hydrostatic pressure) at the first external surface selected from the range of 0.05 MPa to 0.3 MPa. Optionally in any embodiment of methods and systems herein, the wastewater is characterized by a fluid pressure difference between the first external surface and the second external surface selected from the range of 5.2 Pa to 83 Pa. Optionally in any embodiment of methods and systems herein, the wastewater is characterized by a fluid pressure (i.e., hydrostatic pressure) at the first external surface selected from the range of 0.05 MPa to 0.3 MPa.

Optionally in any embodiment of methods and systems herein, the hydroxyl radicals are electrocatalytically and/or photocatalytically generated continuously throughout the internal porous region between the first external surface and the second external surface. Optionally in any embodiment of methods and systems herein, the interaction between the contaminants and the hydroxyl radicals comprises oxidation, decomposition, and/or deactivation of the contaminants.

Optionally in any embodiment of methods and systems herein, light from the light source comprises one or more wavelengths selected from the range of 10 nm to 600 nm, optionally 10 nm to 500 nm, optionally 10 nm to 400 nm, optionally 10 nm to 300 nm, optionally 100 nm to 400 nm, optionally 150 nm to 400 nm, optionally 150 nm to 380 nm, optionally 100 nm to 380 nm, o. Optionally in any embodiment of methods and systems herein, light from the light source is characterized by a peak wavelength, wavelength(s) at max intensity, and/or wavelength(s) at max radiant flux selected from the range of 10 nm to 400 nm, optionally 100 nm to 400 nm, optionally 150 nm to 400 nm, optionally 150 nm to 380 nm, optionally 100 nm to 380 nm, optionally 100 nm to 300 nm optionally 10 nm to 300 nm, optionally 10 nm to 260 nm, optionally 100 nm to 260 nm, optionally 200 nm to 260 nm. Optionally in any embodiment of methods and systems herein, light from the light source comprises one or more wavelengths selected from the range of 185 to 365 nm. Optionally in any embodiment of methods and systems herein, light from the light source comprises UV-C light. Optionally in any embodiment of methods and systems herein, light from the light source comprises one or more wavelengths selected from the range of 200 to 260 nm. Optionally in any embodiment of methods and systems herein, light from the light source having wavelengths selected from the range of 185 to 365 nm penetrates a distance into the porous internal region selected from the range of 1 mm to 100 cm, optionally 1 mm to 50 cm, optionally 2 mm to 50 cm. Optionally, penetration of light is characterized by an illuminance between greater than 1% of the light illuminance at first incidence with the surface prior to penetration. Optionally in any embodiment of methods and systems herein, the light source or the light therefrom is characterized by an illuminance selected from the range of 4 to 30 lux. Optionally in any embodiment of methods and systems herein, the light source or the light therefrom is characterized by an illuminance selected from the range of optionally 1 to 100,000 lux, optionally 3 to 100,000 lux, optionally 4 to 100,000 lux, optionally 5 to 100,000 lux, optionally 10 to 100,000 lux, optionally 50 to 100,000 lux, optionally 100 to 100,000 lux, optionally 200 to 100,000 lux, optionally 1 to 25000 lux, optionally 3 to 25000 lux, optionally 4 to 25000 lux, optionally 5 to 25000 lux, optionally 10 to 25000 lux, optionally 50 to 25000 lux, optionally 100 to 25000 lux, optionally 200 to 25000 lux, optionally 1 to 500 lux, optionally 3 to 500 lux, optionally 4 to 500 lux, optionally 5 to 500 lux, optionally 10 to 500 lux, optionally 50 to 500 lux, optionally 100 to 500 lux, optionally 200 to 500 lux, 3 to 200 lux, optionally 1 to 100 lux, optionally 3 to 100 lux, optionally, 4 to 100 lux, optionally 1 to 50 lux, optionally 3 to 50 lux, optionally 4 to 50 lux. Lux (lx) refers to the SI derived unit of illuminance, measuring luminous flux per unit area, and corresponding to one lumen per square meter.

Optionally in any embodiment of methods and systems herein, the wastewater entering the system and prior to encountering generated hydroxyl radicals is an initial wastewater and wherein the wastewater exiting the system after flowing through the internal porous region is a treated water; and wherein the treated water comprises a lower concentration of one or more contaminants compared to the concentration of the same one or more contaminants in the initial wastewater. Optionally in any embodiment of methods and systems herein, the system is characterized by a $COD_{Cr}$ selected from the range of 300,000 mg/L to 88 mg/L, optionally 300,000 mg/L to 500 mg/L, optionally 300,000 mg/L to 1000 mg/L, optionally less than 300,000 mg/L, optionally less than 400,000 mg/L, optionally greater than 1000 mg/L, optionally greater than 1100 mg/L. Optionally in any embodiment of methods and systems herein, the treated water is characterized by a chemical oxygen demand (COD) of less than 1000 mg/L, optionally less than 500 mg/L, optionally less than 400 mg/L, optionally less than 300 mg/L, optionally less than 200 mg/L, optionally less than 100 mg/L, optionally less than 90 mg/L. Optionally in any embodiment of methods and systems herein, the system or method characterized by a removal ratio for total organic carbon selected from the range of 50% to at least 99.9%, optionally, 50% to 99% optionally, optionally at least 50%, optionally at least 60%, optionally at least 65%, optionally at least 75%, optionally at least 80%, optionally at least 85%, optionally 65% to at least 99.9%. Optionally in any embodiment of methods and systems herein, the system or method characterized by a removal ratio for total organic carbon selected from the range of 50% to at least 99.9%, optionally, 50% to 99% optionally, optionally at least 50%, optionally at least 60%, optionally at least 65%, optionally at least 75%, optionally at least 80%, optionally at least 85%, optionally 65% to at least 99.9%, after a retention time selected from the range of 1 to 5 hours. Optionally in any embodiment of methods and systems herein, the system is capable of removing or reducing the concentration of chlorine ions and/or ammonium ions. Optionally in any embodiment of methods and systems herein, the one or more contaminants comprises ammonium ions, one or more pharmaceuticals, one or more personal care products (PPCP), pathogens, perfluorinated alkyl substances, polyfluorinated alkyl substances, trimethoprim, ciprofloxacin, metoprolol, propranolol, carbamazepine, ammonium ions, heavy oil, acrylonitrile, urea, uric acid, terephthalic acid, coke wastewater, refining wastewater, high salinity wastewater, fracturing flow-back fluid, or any combination of these. Optionally in any embodiment of methods and systems herein, the system is capable of oxidizing, removing, decomposing, or deactivating: perfluorinated alkyl substances, polyfluorinated alkyl substances, E. coli., MS2 biophage, trimethoprim, ciprofloxacin, metoprolol, propranolol, carbamazepine, ammonium ions, chemical oxygen demand (COD), pharmaceuticals, personal care products (PPCP), heavy oil, acrylonitrile, urea, uric acid, terephthalic acid, coke wastewater, refining wastewater, high salinity wastewater, fracturing flow-back fluid, and or combination of these. Optionally in any embodiment of methods and systems herein, the system is characterized by a contaminant bond energy threshold as high as 485 kJ mol$^{-1}$, a decomposition efficiency of a refractory pollutant of as high as 99.9% depending on the energy utilization efficiency of 0.2 to 30 kWh/m$^3$, and/or a theoretical service life of the electrode selected from the range of 1 year to 30 years. Optionally in any embodiment of methods and systems herein, the system is characterized by a contaminant bond energy threshold of 300 kJ mol$^{-1}$, optionally 350 kJ mol$^{-1}$, preferably 400 kJ mol$^{-1}$, more preferably 450 kJ mol$^{-1}$, more preferably 485 kJ mol$^{-1}$. Optionally in any embodiment of methods and systems herein, the system is characterized by decomposition efficiency of a refractory pollutant selected from the range of 80% to 99.9%, optionally 90% to 99.9%, optionally 95% to 99.9%, optionally 99% to 99.9%, depending on the energy utilization efficiency of 0.2-30 kWh/m$^3$. Optionally in any embodiment of methods and systems herein, the system is characterized by a theoretical service life of the electrode selected from the range of 1 year to 30 years, preferably selected from the range of 5 years to 30 years, more preferably selected from the range of 10 years to 30 years.

Optionally in any embodiment of methods and systems herein, the porous substrate has a composition comprising titanium. Optionally in any embodiment of methods and systems herein, the porous substrate comprises or is formed of particles. Optionally in any embodiment of methods and systems herein, at least a portion of the electrocatalytic material and at least a portion of the photocatalytic material is immobilized on the particles of the porous substrate.

Optionally in any embodiment of methods and systems herein, the porous substrate is a porous tube having an outer diameter, and inner diameter, and an inner cavity defined by the tube's inner diameter. Optionally in any embodiment of methods and systems herein, the first external surface is an outer surface of the tube defined by the tube's outer diameter and the second external surface is an inner surface of the tube defined by the tube's inner diameter. Optionally in any embodiment of methods and systems herein, the wastewater flows into the internal porous region through the first external surface and the wastewater flows out of the internal porous region through the second external surface. Optionally in any embodiment of methods and systems herein, the system comprises comprising a light source configured to emit the light at the second external surface. Optionally in any embodiment of methods and systems herein, the system comprises a light source positioned within the inner cavity of the tube. Optionally in any embodiment of methods and systems herein, the system comprises an enclosure surrounding at least a portion of the porous tube; wherein the system comprises an inlet for the wastewater allowing the wastewater to enter the system and flow to the first external surface via the inlet; and wherein the system comprises an outlet allowing the wastewater to flow from the second external surface and exit the system via the outlet.

Optionally in any embodiment of methods and systems herein, the porous substrate is characterized by a thickness between the first external surface and the second external surface, and wherein the substrate's thickness is selected from the range of 3 mm to 10 mm. Optionally in any embodiment of methods and systems herein, the substrate's thickness is selected from the range of 1 mm to 1000 mm, optionally 1 mm to 100 mm, optionally 1 mm to 50 mm, optionally 1 mm to 30 mm, optionally 1 mm to 20 mm, optionally 1 mm to 10 mm, optionally 3 mm to 50 mm, optionally 3 mm to 20 mm. Optionally in any embodiment of methods and systems herein, the outer diameter of the porous tube is selected from the range of 1.5 mm to 5.0 mm. Optionally in any embodiment of methods and systems herein, the outer diameter of the porous tube is selected from the range of 1 mm to 1000 mm, optionally 1 mm to 100 mm, optionally 1 mm to 50 mm, optionally 1 mm to 30 mm, optionally 1 mm to 20 mm, optionally 1 mm to 10 mm, optionally 1 mm to 8 mm, optionally 1 mm to 6 mm. Optionally in any embodiment of methods and systems herein, the inner diameter of the porous tube is selected from the range of 1.5 mm to 5 mm. Optionally in any embodiment of methods and systems herein, the inner diameter of the porous tube is selected from the range of 1 mm to 1000 mm, optionally 1 mm to 100 mm, optionally 1 mm to 50 mm, optionally 1 mm to 30 mm, optionally 1 mm to 20 mm, optionally 1 mm to 10 mm, optionally 1 mm to 8 mm, optionally 1 mm to 6 mm.

Aspects disclosed herein include a wastewater treatment system comprising: a porous substrate having a first external surface, a second external surface opposite the first external surface, and an internal porous region between the first external surface and the second external surface; a photocatalytic material immobilized on at least a portion of the first external surface, on at least a portion of the second external surface, and/or in at least a portion of the internal porous region; and a wastewater flowing between the first external surface and the second external surface through the internal porous region; wherein the wastewater is in contact with the photocatalytic material; wherein: at least a portion of the photocatalytic material is exposed to a light sufficient to photocatalytically generate hydroxyl radicals at the photocatalytic material; the wastewater flowing in the internal porous region comprises oxygen bubbles and at least a portion of the generated hydroxyl radicals; and a concentration of contaminants in the wastewater is decreased by interaction between the contaminants and the photocatalytically generated hydroxyl radicals. Optionally, at least a portion of the oxygen bubbles in the wastewater flowing in the internal porous regions is oxygen bubbles generated in the system.

Aspects disclosed herein include a method for wastewater treatment, the method comprising: flowing a wastewater having an initial concentration of one or more contaminants into a wastewater treatment system; treating the initial wastewater in the system to produce a treated water having a final concentration of the one or more contaminants; wherein the final concentration is less than the initial concentration; and removing the treated water from the system; wherein the system comprises: a porous substrate having a first external surface, a second external surface opposite the first external surface, and an internal porous region between the first external surface and the second external surface; an electrocatalytic material immobilized on at least a portion of the first external surface and/or in at least a portion of the internal porous region; and a photocatalytic material immobilized on at least a portion of the second external surface and/or in at least a portion of the internal porous region; wherein: the wastewater flows between the first external surface and the second external surface through the internal porous region; the wastewater is in contact with the electrocatalytic material and the photocatalytic material; the wastewater flowing in the internal porous region comprises oxygen bubbles and at least a portion of the generated hydroxyl radicals; wherein the step of treating comprises: electrocatalytically generating at least a portion of the hydroxyl radicals in the wastewater by subjecting the electrocatalytic material to an anodic bias sufficient to electrocatalytically generate the hydroxyl radicals; photocatalytically generating at least a portion of the hydroxyl radicals in the wastewater by exposing at least a portion of the photocatalytic material a light sufficient to photocatalytically generate the hydroxyl radicals; generating the oxygen bubbles in the wastewater at the electrocatalytic material and/or at the photocatalytic material; and reducing the concentration of the one or more contaminants from the initial concentration to the final concentration at least via an interaction between the one or more contaminants and the hydroxyl radicals. Optionally, at least a portion of the oxygen bubbles in the wastewater flowing in the internal porous regions is oxygen bubbles generated in the system. Optionally, the method comprises transport of a portion of the hydroxyl radicals between the oxygen bubbles and the wastewater within the internal porous region. Optionally, the oxygen bubbles flow through pores of the internal porous region thereby confining a liquid layer adjacent to a nearest pore surface to a thickness of less than 5 µm, optionally less than less than 3 µm, optionally less than less than 2 µm, optionally less than less than 1 µm, optionally less than less than 800 nm, optionally less than less than 600 nm, optionally less than less than 500 nm, optionally selected from the range of 100 nm to 10 µm, optionally selected from the range of 100 nm to 5 pm, optionally selected from the range of 100 nm to 1 µm. Optionally, the oxygen bubbles flow through pores of the internal porous region thereby confining a liquid layer adjacent to a nearest pore surface to an average thickness of less than 5 µm, optionally less than less than 3 µm, optionally less than less than 2 µm, optionally less than less than 1 µm, optionally less than less than 800 nm, optionally less than less than 600 nm, optionally less than less than 500 nm, optionally selected from the range of 100 nm to 10 µm, optionally selected from the range of 100 nm to 5 µm, optionally selected from the range of 100 nm to 1 µm. Optionally, an average thickness of the liquid wastewater layer at surfaces within the internal porous region is less than 50 µm, optionally less than 20 µm, optionally less than 10 µm, optionally less than 5 µm, optionally less than less than 3 µm, optionally less than less than 2 µm, optionally less than less than 1 pm, optionally less than less than 800 nm, optionally less than less than 600 nm, optionally less than less than 500 nm, optionally selected from the range of 100 nm to 10 µm, optionally selected from the range of 100 nm to 5 µm, optionally selected from the range of 100 nm to 1 µm. Optionally, reducing the concentration of the one or more contaminants comprises oxidizing, decomposing, and/or deactivating the one or more contaminants. Optionally, the method comprises indrafting the generated oxygen bubbles into the porous internal region. Indrafting may refer to bubbles flowing into the porous internal structure from outside the porous internal region and/or flowing further into or through the porous internal region. Optionally, the method comprises compressing the generated oxygen bubbles within the porous internal region when flowing from large pores to relatively smaller pores. Optionally, the method comprises swelling the generated oxygen bubbles within the porous internal region when flowing from small pores to relatively larger pores. Optionally, the method comprises exchanging hydroxyl radicals between a gas phase of oxygen bubbles and the liquid wastewater within the internal porous region.

Aspects disclosed herein include a method for wastewater treatment, the method comprising: flowing a wastewater having an initial concentration of one or more contaminants into a wastewater treatment system; treating the initial wastewater in the system to produce a treated water having a final concentration of the one or more contaminants; wherein the final concentration is less than the initial concentration; and removing the treated water from the system; wherein the system comprises: a porous substrate having a first external surface, a second external surface opposite the first external surface, and an internal porous region between the first external surface and the second external surface; and a photocatalytic material immobilized on at least a portion of the second external surface and/or in at least a portion of the internal porous region; wherein: the wastewater flows between the first external surface and the second external surface through the internal porous region; the wastewater is in contact with the photocatalytic material; the wastewater flowing in the internal porous region comprises oxygen bubbles and at least a portion of the generated hydroxyl radicals; wherein the step of treating comprises: photocatalytically generating at least a portion of the hydroxyl radicals in the wastewater by exposing at least a portion of the photocatalytic material a light sufficient to photocatalytically generate the hydroxyl radicals; generating the oxygen bubbles in the wastewater at the photocatalytic material; and reducing the concentration of the one or more contaminants from the initial concentration to the final concentration at least via an interaction between the one or more contaminants and the hydroxyl radicals.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 7: Oxygen evolution potential of various electrode materials used as

REM (CNT, $Bi/SnO_2$-CNT, $TiO_x$) and thermodynamic potential for the formation of the primary oxidant species. Higher oxygen evolution potential favors the formation of oxidant species (C. Trellu et al., Chemosphere, 2018, 208, 159-175).

Figure 8A:
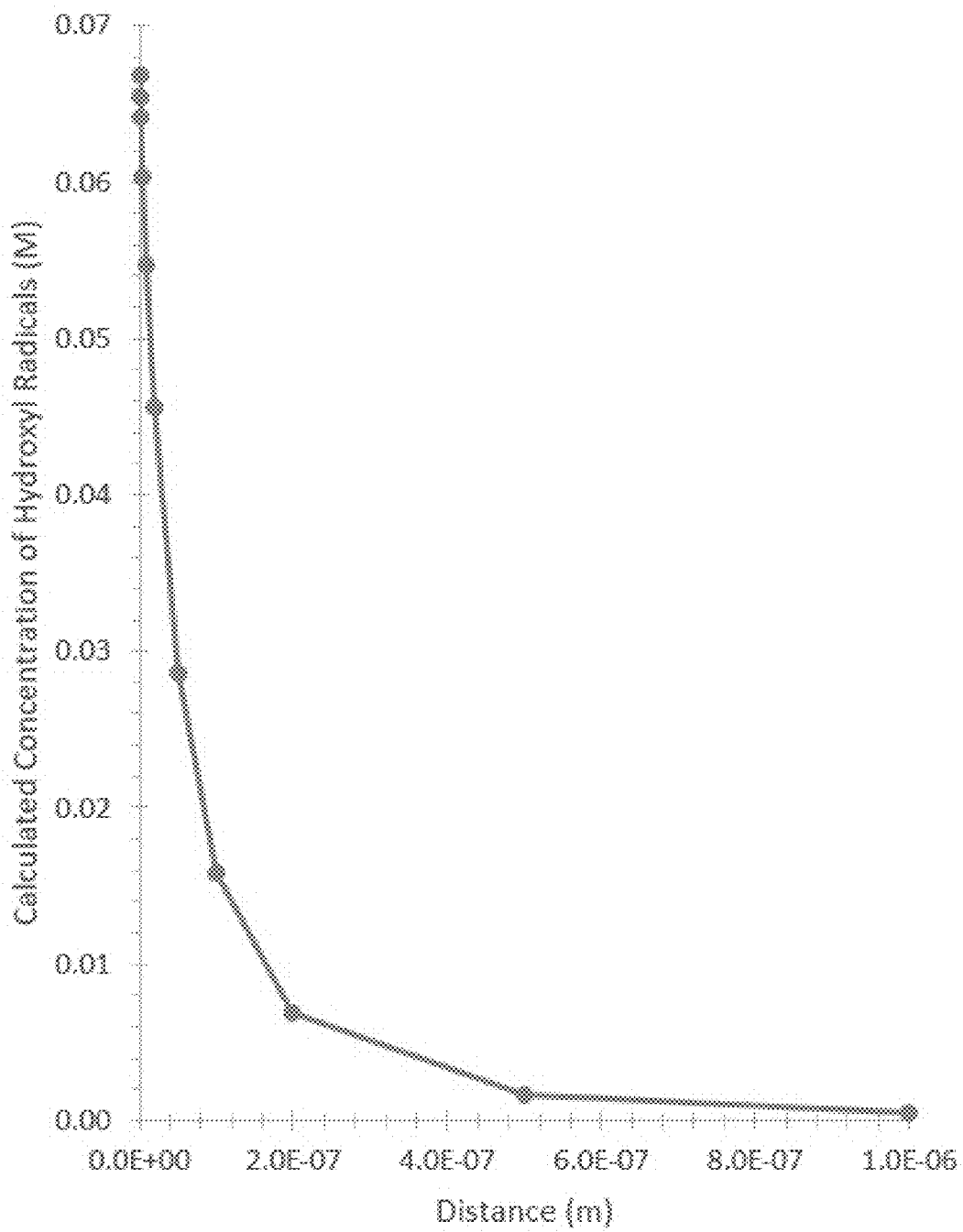
Figure 8B:
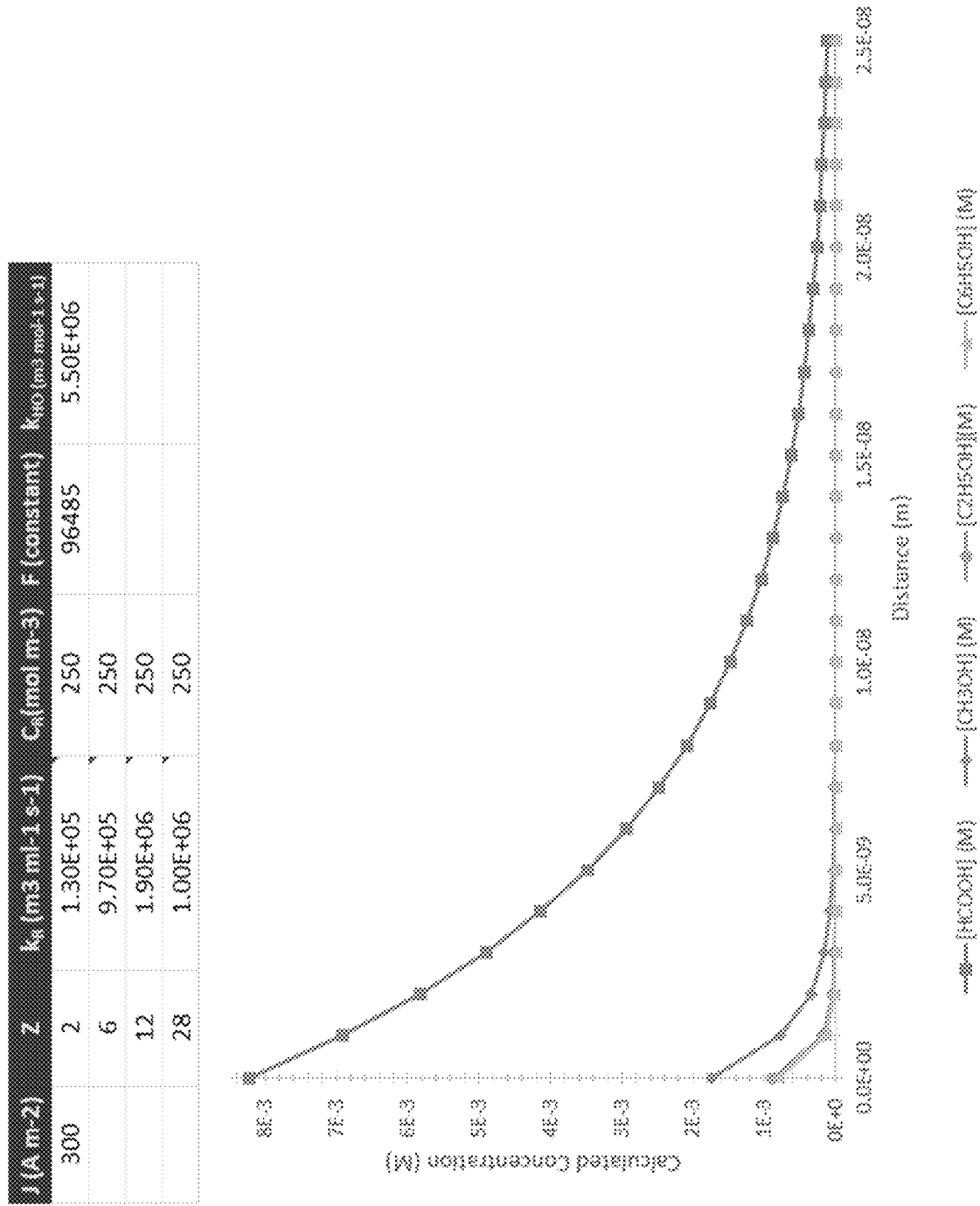

FIGS. 8A-8B: The calculated concentration profile of different species in a traditional plat electrode electrocatalytic reactor. FIG. 8A is a plot of calculated concentration profile of hydroxyl radicals. FIG. 8B is a plot of concentration profile of different carbohydrate molecules as simulated pollutants. The two plots are calculated using the rate constant k specified as shown in the figures. FIG. 8A is under the condition where no carbohydrate substrate exists. Each line in FIG. 8B is generated under the condition that only that particular carbohydrate species exists. All other conditions or parameters between 8A and 8B are assumed to be identical.

Figure 9:
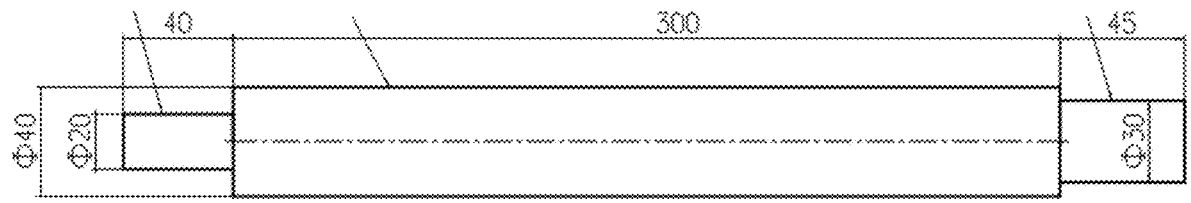

FIG. 9: Machine drawing of a porous substrate tube, an exemplary configuration of a porous substrate according to certain embodiments herein. The dimensions shown are example and may be varied without deviating from the scope herein.

Figure 10:
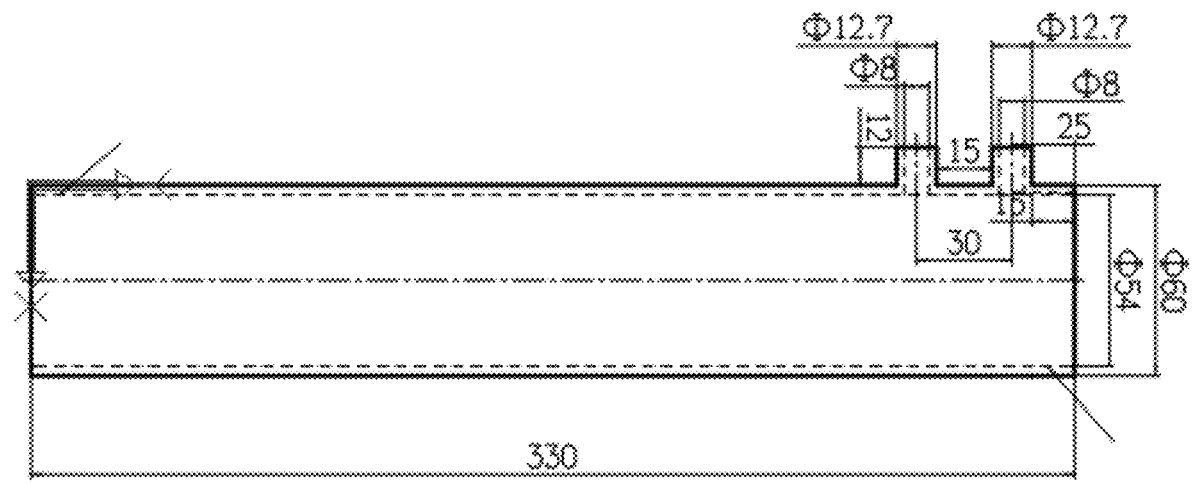

FIG. 10: Machining drawing of an enclosure, such as a stainless-steel case, according to various embodiments herein. The dimensions shown are example and may be varied without deviating from the scope herein.

Figure 11:
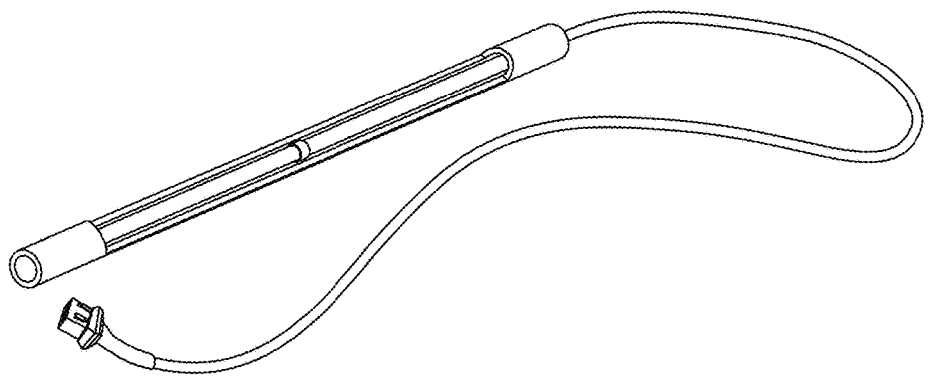

FIG. 11: A photograph of a light source, a PHILIPS UV-C light.

Figure 12:
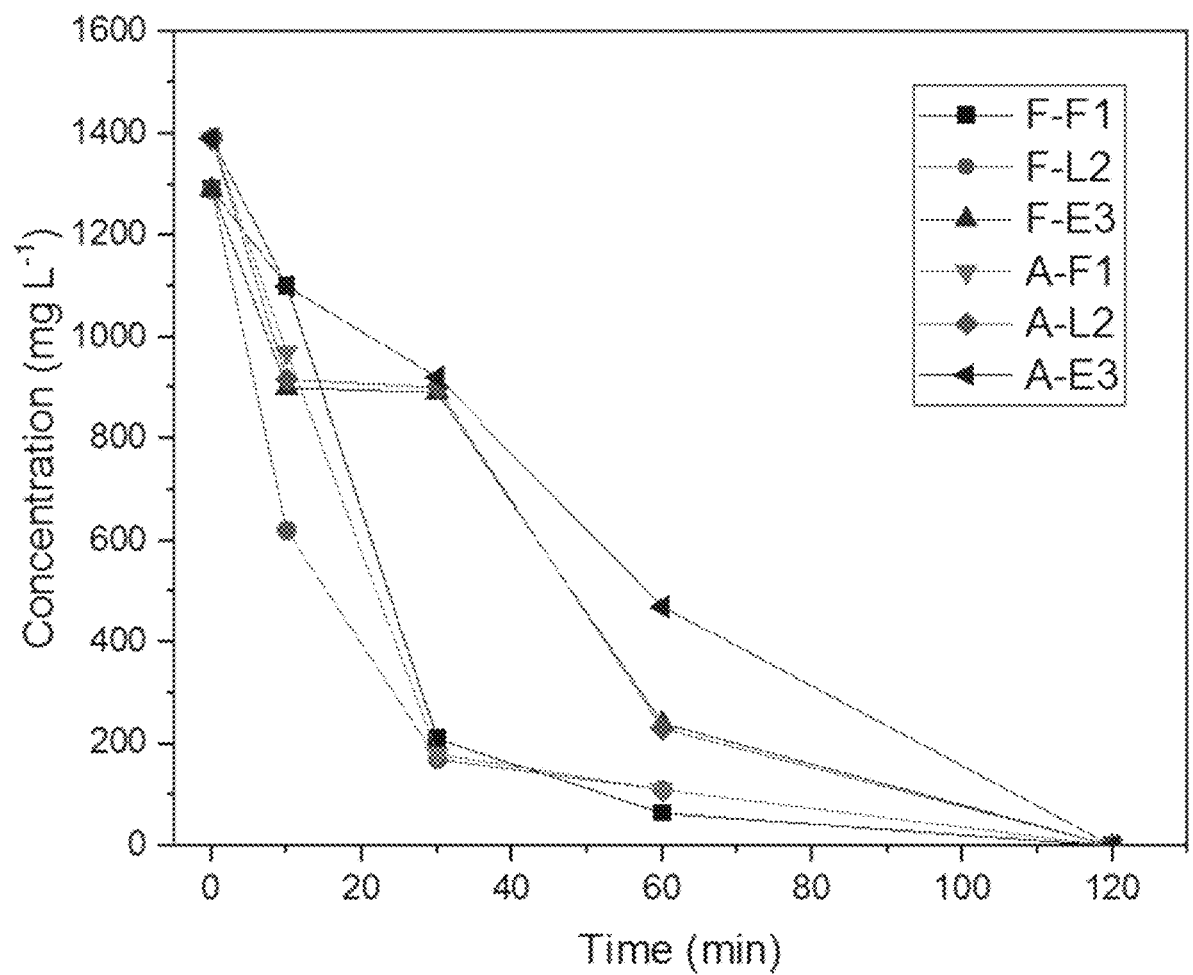

FIG. 12: The COD concentration as the function of reaction time on two pharmaceutical wastewaters (F and A) treated at the flow rate of 1L $min^{-1}$ (F1), 1.5 L $min^{-1}$ (L2), 2 L $min^{-1}$ (E3).

Figure 13:
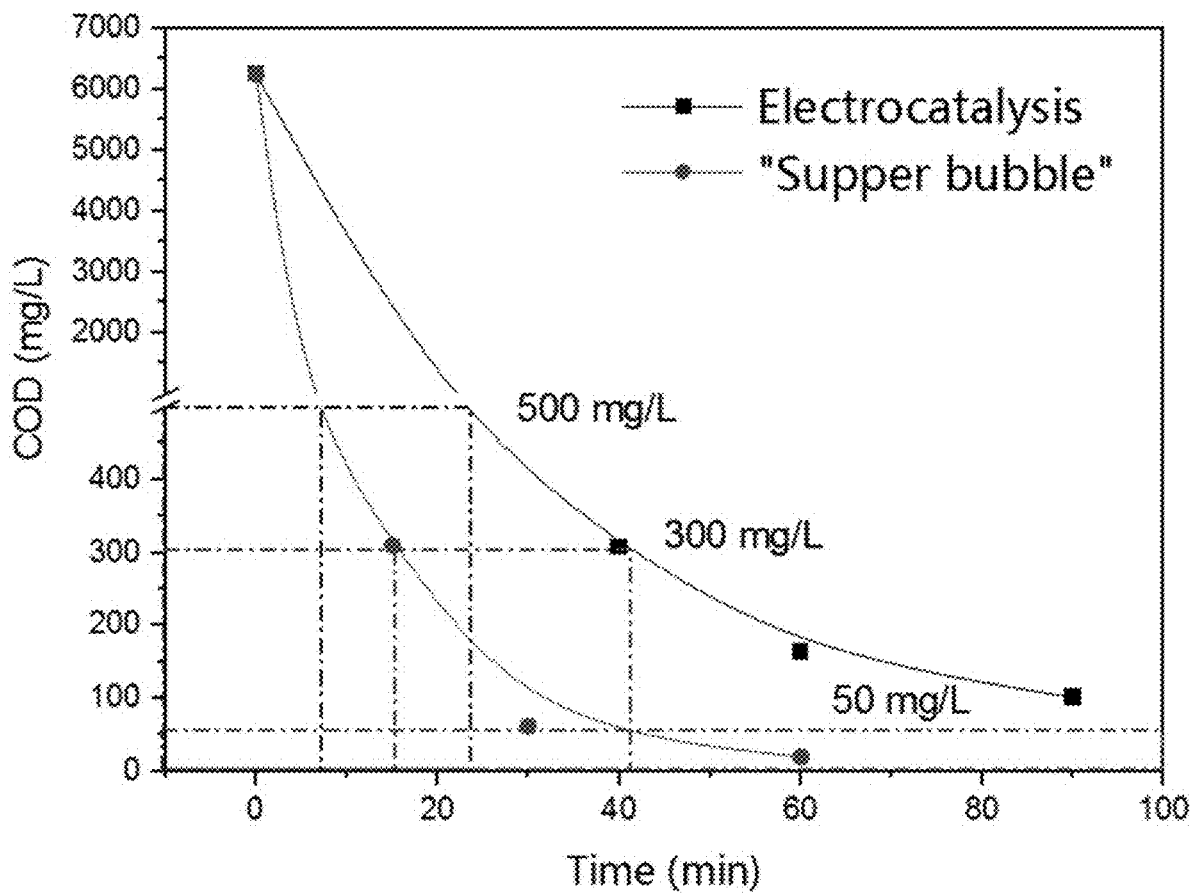

FIG. 13: A plot of COD vs. time showing processes comparison between electrocatalysis and "super bubble" system.

Figure 14:
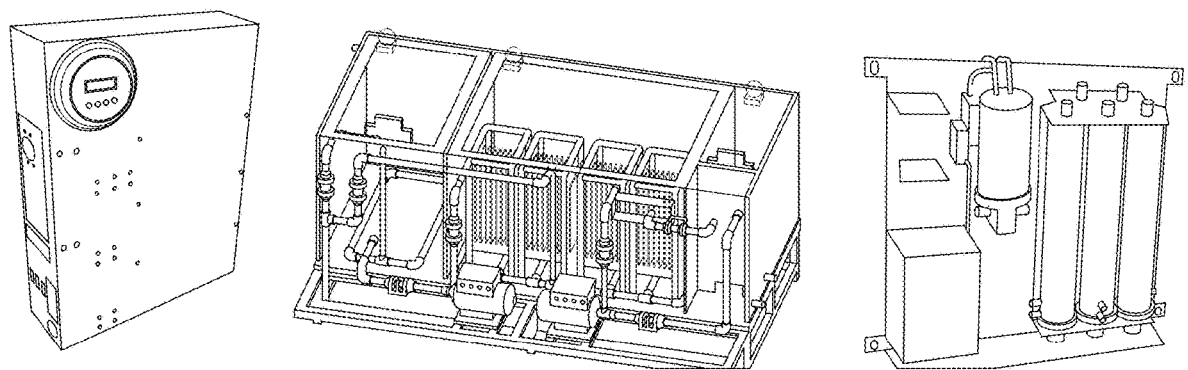

FIG. 14: An example water treatment system equipped with systems disclosed herein according to certain embodiments, such as "super bubble" reactor tubes.

Figure 15:
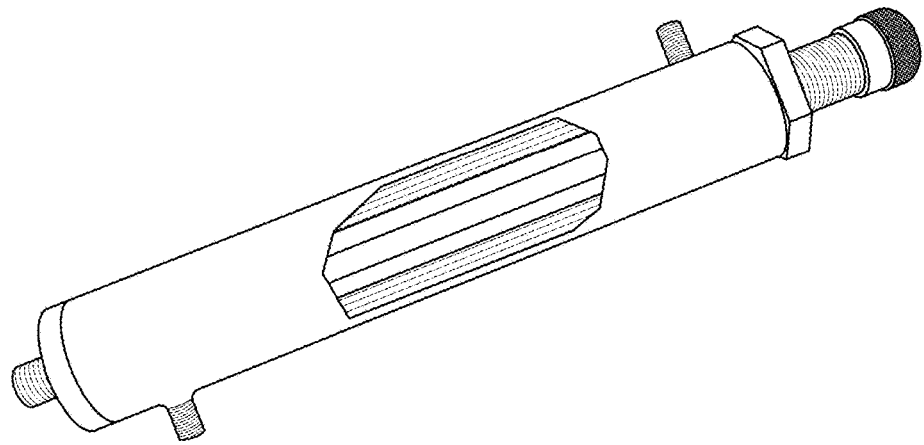

FIG. 15: An illustration, with a cutout view, of a wastewater treatment system, according to certain embodiments.

Figure 16:
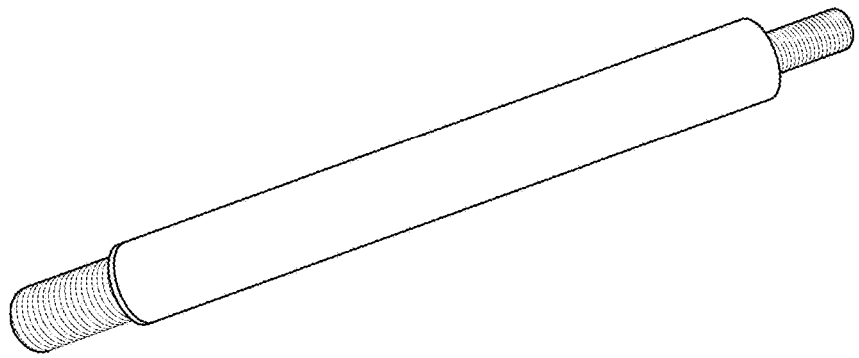

FIG. 16: An illustration of a porous substrate in tube form, such as a porous titanium tube coated with photocatalyst.

Figure 17:
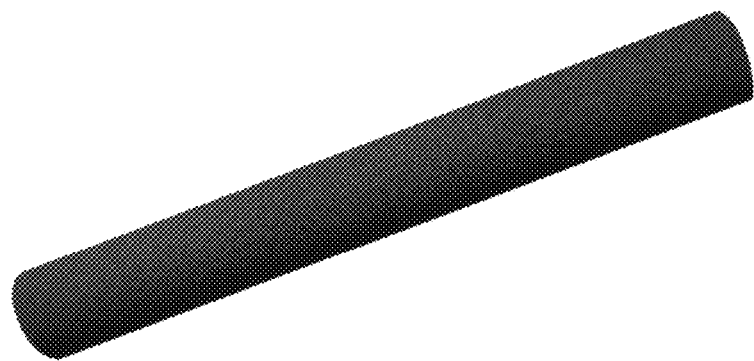

FIG. 17: An illustration of a porous substrate in tube form, such as a porous titanium tube coated with electrocatalyst.

Figure 18:
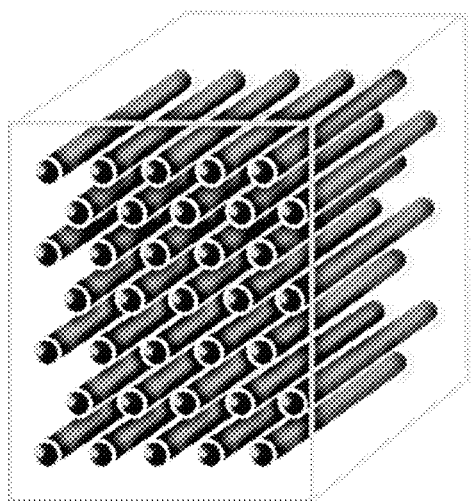
Figure 18:
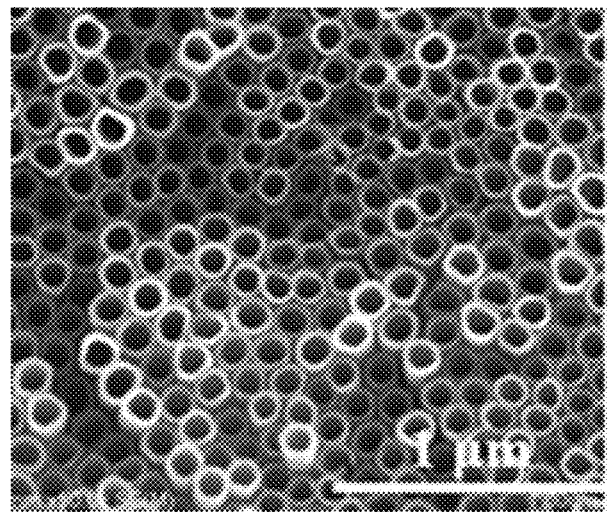

FIG. 18: Schematic (left) and scanning electron microscope image (right) showing a nanostructured photocatalyst in the form of titanium nanotube photocatalyst on titanium particles of the porous substrate.

Figure 19:
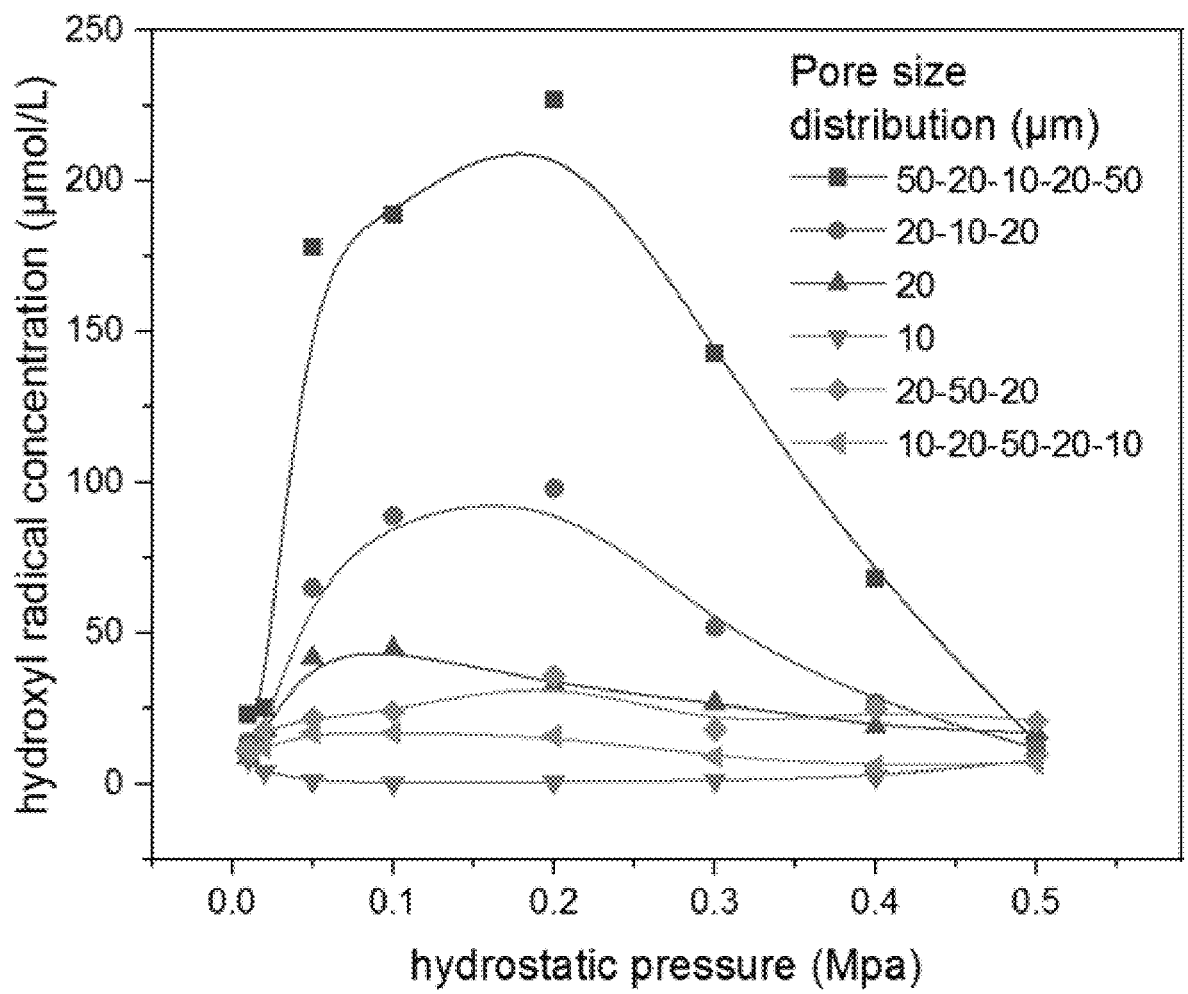

FIG. 19: A plot of hydroxyl radical concentration as a function of hydrostatic pressure under the different pore size distribution in the internal porous region of a wastewater treatment system, according to embodiments herein.

Figure 20:
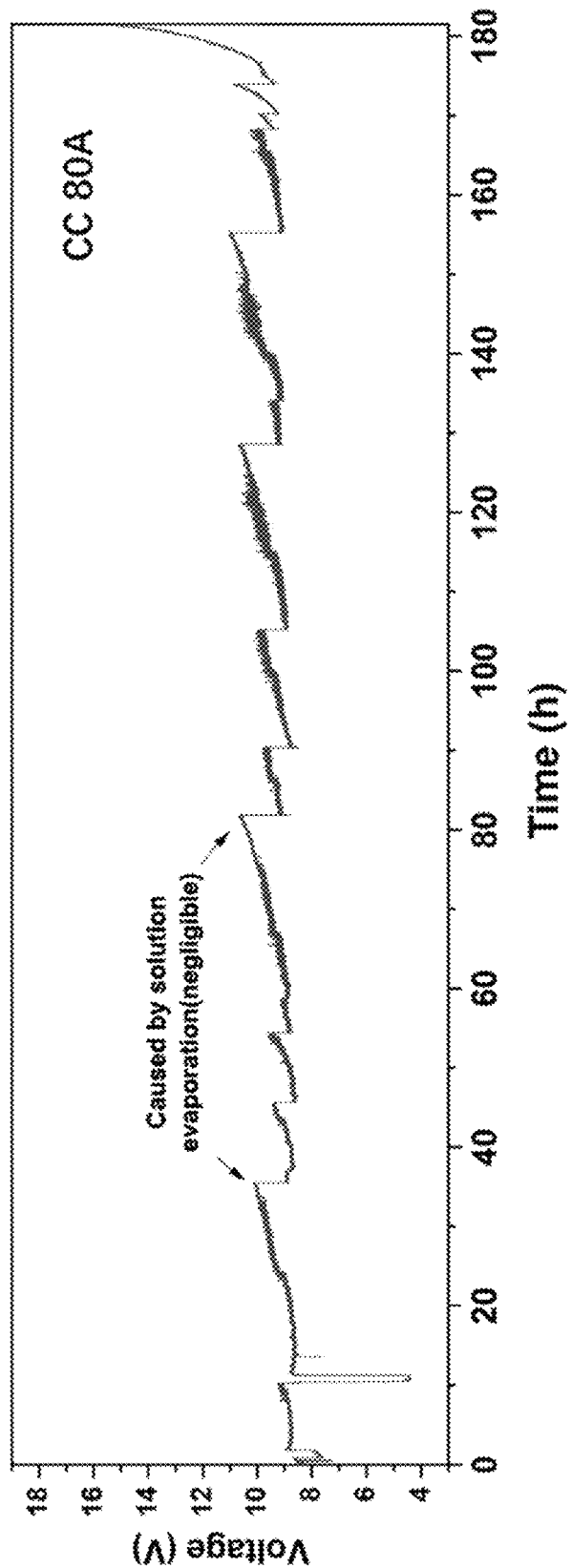

FIG. 20: The cell potential vs. electrolysis time during the accelerated lifetime test in 3M $H_2SO_4$ solution. See associated discussion in Example 15.

STATEMENTS REGARDING CHEMICAL COMPOUNDS AND NOMENCLATURE

In general, the terms and phrases used herein have their art-recognized meaning, which can be found by reference to standard texts, journal references and contexts known to those skilled in the art. The following definitions are provided to clarify their specific use in the context of the invention.

The term "wastewater treatment system" refers to a system capable of generating hydroxyl radicals using an electrocatalytic material and/or an electrocatalytic material for treating or decontaminating water or an aqueous solution.

The term "electrocatalytic material" refers to a material that participates in or facilitates an electrochemical process or reaction. The term "electrocatalytic" refers to a material or item that is or is capable of being an electrocatalyst. An electrocatalyst is a catalyst capable of being an electrocatalytic material. More particularly, an electrocatalytic material is a catalyst that increases or can increase the rate of the redox reactions in electrochemical systems. Electrocatalysts may be generally referred to an anode (electro)catalysts or cathode (electro)catalysts. For example, when applying a certain electric potential between an anode and a cathode, the anode or anodic catalyst can capture the electrons of contaminants in water and oxidize the contaminants. The cathode or cathodic electrocatalyst can donate electrons to reduce contaminants. In some embodiments, general conductor or current conductor elements or materials in an electrochemical system (e.g., metal, graphite, conductive ceramics, etc.) can be regarded as electrocatalysts. In embodiments preferable for some applications, a material is an electrocatalyst or electrocatalytic material if it satisfies at least two of the following criteria (1)-(6), preferably at least three of the following criteria (1)-(6), more preferably at least four of the following criteria (1)-(6), further more preferably at least five of the following criteria (1)-(6), still more preferably all of the following criteria (1)-(6):

(1) There is a stable binding force between the electrocatalytic material and a surface of the porous substrate, such as in the internal porous region thereof. The electrocatalytic material should not easily peel or flake off the substrate or decompose or dissolve off the porous substrate. The electrocatalytic material may be coated from a sol-gel or aqueous solution or suspension. The electrocatalytic material may be directly deposited on a surface of the porous substrate, such as in the internal porous region thereof.

(2) The resistivity of an electrocatalytic material is preferably less than 0.001 Ω·m.

(3) The oxygen evolution potential (OEP) of an electrocatalytic material is preferably in the range of 1.6 to 2.3 V vs. SHE, inclusively.

(4) The chemical durability of an electrocatalytic material is preferably more than 1000 hours under a pH in the range of 3 to 8 (preferably all pH in the range of 3 to 8), under an anodic bias selected from the range of 1.8 V to 4.5 V vs. Ag/AgCl (preferably any and all anodic bias selected from the range of 1.8 V to 4.5 V vs. Ag/AgCl). Such chemical durability facilitates retention of the photocatalyst activity in a strongly oxidative environment. For example, the electrocatalytic material remains operably immobilized on the substrate and is capable of generating hydroxyl radicals after 1000 hours under a pH in the range of 3 to 8 (preferably all pH in the range of 3 to 8), under an anodic bias selected from the range of 1.8 V to 4.5 V vs. Ag/AgCl (preferably any and all anodic bias selected from the range of 1.8 V to 4.5 V vs. Ag/AgCl).

(5) The electrocatalytic material preferably comprises Pt, PbO2, boron-doped diamond, or a combination of these.

(6) The electrocatalytic material preferably comprises at least one crystalline form active for the evolution of hydroxyl radicals at a rate selected from the range of 10 to 500 mmol/cm$^2$/h under the current density selected from the range of 5 to 20 mA/cm$^2$. Such property of the electrocatalytic material is beneficial to yielding sufficient oxidative radicals to destroy contaminants.

The term "photocatalytic material" refers to a material that generates catalyst activity or behaves as a catalyst using or as a result of using energy from light, such as converting photon energy to catalytic activity. The term "photocatalytic" refers to a material or item that is or is capable of being a photocatalyst. A photocatalyst is a catalyst capable of being a photocatalytic material. When a photocatalyst is exposed to light in the presence of water, for example, some reactive oxygen species will be produced to destroy the organic and/or inorganic contaminants in the water. Generally, though not necessarily, a photocatalyst is a semiconductor. In embodiments preferable for some applications, a material is an electrocatalyst or electrocatalytic material if it satisfies at least two of the following criteria (1)-(5), preferably at least three of the following criteria (1)-(5), more preferably at least four of the following criteria (1)-(5), further more preferably all five of the following criteria (1)-(5):

(1) There is a stable binding force between the photocatalytic material and a surface of the porous substrate, such as in the internal porous region thereof. The photocatalytic material should not easily peel or flake off the substrate or decompose or dissolve off the porous substrate. The photocatalytic material may be coated from a sol-gel or aqueous solution or suspension. The photocatalytic material may be directly deposited on a surface of the porous substrate, such as in the internal porous region thereof.

(2) A band gap, as the term is known in the field of solid-state physics, of the photocatalytic material is preferably selected from the range of 2.4-6.7 eV, inclusively, which promises its ability for absorptivity of light characterized by wavelength(s) in the range of 185 nm to 516 nm.

(4) The chemical durability of the photocatalytic material is preferably more than preferably 1000 hours under a pH in the range of 3 to 14 (preferably at all pH in the range of 3 to 14), which facilitates retention of the photocatalyst activity in a strongly oxidative environment. For example, the photocatalytic material remains operably immobilized on the substrate and is capable of generating hydroxyl radicals under 254 nm UV irradiation after at least 1000 hours under a pH in the range of 3 to 14 (preferably at all pH in the range of 3 to 14).

(5) The photocatalytic material preferably comprises at least one crystalline form active for the evolution of hydroxyl radicals at a rate selected from the range of 0.1 to 20 mmol/g/h under the irradiation of 254 nm UV lamp characterized by illuminance selected from the range of 4 to 30 lux. Such property of the electrocatalytic material is beneficial to yielding sufficient oxidative radicals to destroy contaminants.

The term "electrochemical system" refers to devices and/or device components, such as one or more electrochemical cells, that perform electrochemistry. Electrochemistry refers to conversion of chemical energy into electrical energy or electrical energy into chemical energy. Chemical energy can correspond to a chemical change or chemical reaction. Electrochemistry can thus refer to a chemical change (e.g., a chemical reaction of one or more chemical species into one or more other species) generating electrical energy and/or electrical energy being converted into or used to induce a chemical change. Examples of a chemical change or chemical reaction include oxidation of a contaminant or pollutant and/or formation of an oxidant or other reactive species that can oxidize a contaminant or pollutant. Electrical energy refers to electric potential energy, corresponding to a combination of electric current and electric potential in an electrical circuit. An exemplary electrochemical system or electrochemical cell is an electrolytic cell. Electrochemical cells have two or more electrodes (e.g., negative and positive electrodes; e.g., cathode and anode) and one or more electrolytes. An anode is defined as the electrode at which oxidation occurs, or, in other words, a chemical change being an oxidation occurs at the anode. A cathode is defined as the electrode at which reduction occurs, or, in other words, a chemical change being a reduction occurs at the cathode. An electrolyte may include species that are oxidized and species that are reduced during charging or discharging of the electrochemical cell. An exemplary electrolyte is be wastewater or an aqueous solution, such as an aqueous solution comprising one or more contaminants. For example, the electrolyte is an aqueous solution. Reactions occurring at the electrode, such as sorption and desorption of a chemical species or such as an oxidation or reduction reaction, contribute to charge transfer processes in the electrochemical cell. Electrochemical oxidation may occur at the cathode, for example, and electrochemical reduction may occur at the anode, for example. Electrochemical oxidation refers to a chemical oxidation reaction accompanied by a transfer of electrical energy (e.g., electrical energy input driving the oxidation reaction) occurring in the context an electrochemical cell. Similarly, electrochemical reduction refers to a chemical reduction reaction accompanied by a transfer of electrical energy occurring in the context an electrochemical cell. The term "electrochemically" or "electrochemical" may describe a reaction, process, or a step thereof, as part of which chemical energy is converted into electrical energy or electrical energy is converted into chemical energy. For example, a product may be electrochemically formed when electrical energy is provided to help the chemical conversion of a reactant(s) to the product proceed. The term "non-electrochemical" refers to a reaction or process that does not include electrochemistry and/or does not require electrochemistry in order to be performed. Wastewater treatment systems disclosed herein that comprise an electrocatalytic material subject to an anodic bias may be referred to and/or characterized as comprising, at least in part, an electrochemical system. Electrocatalytic materials disclosed herein, when in presence of wastewater and subject to an anodic bias in wastewater treatment systems disclosed herein, according to certain embodiments, may be characterized as electrochemically or electrocatalytically oxidizing or otherwise decomposing contaminants directly and/or indirectly, such as directly by direct electrochemical oxidation of a contaminant at the electrocatalytic material (by involving transfer of electrons between the contaminant and the electrocatalytic material) or indirectly by electrochemically/electrocatalytically oxidizing water, for example, to generate hydroxyl radicals which in turn decompose contaminants.

As used herein, the terms "water decontamination," "water treatment," and "water purification" can be used interchangeably and are generally intended to refer to removal of pollutants or contaminants from water or aqueous solution by decomposition, destruction, denature, or degradation of the pollutants or contaminants.

Generally, decomposition or destruction of a contaminant refers to change of physical characteristics (e.g., characteristic particle size, etc.) and/or chemical characteristics (e.g., composition, formula, structure, etc.) of the contaminant, preferably such that the contaminant can no longer be characterized as a contaminant.

The terms "contaminant" and "pollutant" are used interchangeably and refer to a species in a solution, preferably an aqueous solution, which is undesired and intended to be removed, or at least have its concentration reduced, using water decontamination. Optionally, contaminants are species that are toxic to humans or animals. Optionally, contaminants are species whose presence in a solution is prohibited or otherwise discouraged according to health and safety regulations or laqs, or any other regulations or laqs, and/or whose concentration is greater than permitted or than recommended according to health and safety, or any other, regulatory rules or laws in effect where the solution is generated, used, processed, treated, distributed, and/or sold. For example, water intended for human consumption is subject to various regulations wherein materials prohibited from being in such water or materials present at a concentration at or above a prohibited threshold for such water are considered contaminants. Contaminants can be particulates, molecules, compounds, salts, ions, atoms, toxins, other chemical agents, biological agents or pathogens, such as bacteria, viruses and fungi, and any other such chemical and/or physical species. For example, contaminants in a solution can be dissolved, dispersed, and/or suspended in the solution. Contaminants can be characterized as contaminants by their physical characteristics (e.g., characteristic particle size) and/or chemical characteristics (e.g., composition, formula, structure). Generally, the term "wastewater" refers to water or aqueous solution that comprises one or more contaminants or pollutants. Optionally, wastewater refers to water or aqueous solution that is a waste product of a process, such as an industrial process, which has one or more contaminants or pollutants. Greywater, such as wastewater generated in households and/or office building from streams without fecal contamination, and blackwater, such as wastewater comprising sewage or fecal contamination, are examples of wastewater or water having one or more contaminants or pollutants. Decontamination or purification of greywater is contemplated herein using electrodes, systems, and methods disclosed herein. Decontamination or purification of blackwater is contemplated herein using electrodes, systems, and methods disclosed herein.

The "contaminant bond energy threshold" refers to a maximum chemical bond energy of a contaminant that may be broken or oxidized in the system or method. The high contaminant bond energy threshold is facilitated or provided at least by the high density or concentration of hydroxyl radicals generated in the systems and methods, particularly in the porous internal region, disclosed herein.

The term "water-permeable" refers to a membrane, electrode, film, layer, coating, or any other material or item that is permeable to water or through which liquid water may penetrate and flow. In preferred embodiments, for example, the porous substrate and its internal porous region is water-permeable.

The term "porous" refers to a component or item, a substrate, a material, or a portion or region of any of these that has porosity. The term "porosity" refers to the amount of a material or item, such of a substrate or internal porous region thereof, corresponding to an absence of said material or item, such as absence corresponding to pores, such as apertures, channels, voids, etc. Generally, porosity refers to absence of said material or item within the physical bounds of said material or item, such as due to the material or item having a porous internal structure. Porosity may be expressed as the percentage of the volume of a material or item, which corresponds to pores, such as apertures, channels, voids, etc., relative to the total volume occupied by the material or item. Generally, microchannels are a species of pores. Preferably for some applications, the pores of the porous substrate, or inner porous region thereon, are characterized as microchannels. In some embodiments, the term pore and microchannel are equivalent and used interchangeably.

Porosity can also be characterized by characterizing the pores of the porous material or item. For example, pores can be characterized by a "size characteristic." For example, a size characteristic of pores is a "characteristic pore diameter," which may be an empirically-derived value. A characteristic pore diameter refers to an average cross-sectional diameter or cross-sectional width of the pores of a porous material or item, such as a porous substrate or an internal porous region thereof. Unless stated otherwise, the term "pore size" or "average pore size" refers to the characteristic pore diameter. Likewise, oxygen bubbles may be characterized by a characteristic diameter or characteristic size.

The term "pore size distribution" generally refers to a spatial arrangement or spatial relationship of pores with respect to their characteristic pore diameter, such as along a thickness or width of a porous substrate. The term "large-small-large pore size distribution" refers to a distribution or spatial arrangement of characteristic pore diameters of pores such that along a particular direction of a porous material, such as long a thickness or width of a porous substrate, such as a porous tube, or internal porous region thereof, wherein the porous substrate comprises pores having larger characteristic diameters (large pores) than one or more groups of other pores having relatively small characteristic diameters (small pores), said distribution or spatial arrangement can be characterized as having large pores, followed by smaller pores, followed by larger pores.

The term "size characteristic" refers to a property, or set of properties, of a pore that directly or indirectly relates to a size attribute of the pore or particle. According to some embodiments, a size characteristic corresponds to an empirically-derived size characteristic of a pore or particle(s) being detected, such as a size characteristic based on, determined by, or corresponding to data from any technique or instrument that may be used to determine a pore size or particle size, such as electron microscopy (e.g., for characterizing particles or pores; e.g., SEM and TEM), mercury intrusion porosimetry (e.g., for characterizing pores), a bubble gas transport technique (e.g., for characterizing pores), adsorption-desorption technique such as a Barett-Joyner-Halenda method (e.g., for characterizing pores), a permporometry technique (e.g., for characterizing pores), a thermoporometry technique (e.g., for characterizing pores), a gas permeability technique (e.g., for characterizing pores), optical microscopy (e.g., for characterizing pores or particles), mass transport technique (e.g., for characterizing pores), or a light scattering technique (e.g., for characterizing particle; e.g., DLS). For example, in reference to a particle, a size characteristic can correspond to a spherical particle exhibiting similar or substantially same properties, such as aerodynamic, hydrodynamic, optical, and/or electrical properties, as the particle(s) being detected). According to some embodiments, a size characteristic corresponds to a physical dimension, such as length, width, thickness, or diameter. Size characteristics of a pore include length, width, diameter, surface area, geometrical parameter, or void volume in the pore. A plurality of pores can be characterized by an average size characteristic, such as an empirically-derived numerical average of the respective size characteristic of each pore of the plurality of pores. A pore may be a longitudinal pore, for example. A longitudinal pore is one whose length is at least 20% greater than its diameter (or, than width of its void volume, for example, if diameter is not an appropriate characteristic).

Generally, as used herein, the terms "oxidants" and "reactive species" refer to chemical species that can chemically decompose or destroy, such as but not necessarily by chemical oxidation, one or more contaminants or pollutants. As such, generally, oxidants and reactive species, as referred to herein, can facilitate indirect decomposition or destruction of one or more contaminants. Such oxidants and reactive species include, but are not limited to, any one or combination of hydroxyl radicals, chlorine, reactive chlorine species, reactive oxygen species, and ozone.

"Fluid communication" refers to the arrangement of two or more materials or items such that a fluid can be transported to, past, through, and/or from one material or item to another. For example, in some embodiments two materials or items are in fluid communication with one another if a fluid flow path is provided directly between the two materials or items. In some embodiments, two materials or items are in fluid communication with one another if a fluid flow path is provided indirectly between the two materials or items, such as by including one or more other materials or items or flow paths between the two materials or items. In one embodiment, two materials or items present in a body of fluid are not necessarily in fluid communication with one another unless fluid from the first material or item is drawn to, past and/or through the second material or item, such as along a flow path.

Chemical oxygen demand (COD) is the amount of oxygen needed to oxidize the organic matter present in water. Chemical oxygen demand testing is used to determine the amount of oxidation that will occur and the amount of organic matter in a water sample. Generally, one can use COD (chemical oxygen demand) or TOC (total organic carbon) to estimate the relative concentration of organic contaminant/pollutant in a wastewater. Generally, COD concentration can be measured by oxidizing the wastewater by potassium permanganate ($COD_{Mn}$) or potassium dichromate ($COD_{Cr}$). The $COD_{Mn}$ is used infrequently. Unless otherwise specified, $COD_{Cr}$ is equivalent to COD.

The term "removal ratio" refers to a percentage of the initial concentration of the contaminant removed or decomposed as a result of a water treatment. For example, if 50% of contaminant was removed from the treated solution, the removal ratio is 50%. Therefore, removal ratio can be used to characterize removal performance of any contaminants/pollutants.

The term "retention time" (RT) is also referred to in the art as "hydraulic retention time" (HRT), and it is the reaction time of a body of wastewater after it has been injected in a reactor. The longer the RT, the higher the extent of reaction. However, the power consumption will increase as well.

The decomposition efficiency of a refractory pollutant largely depends on the energy consumption. Theoretically, almost all contaminant can be removed from the wastewater as long as the electric field and light intensities are high enough, or the retention time long enough, except for some persistent contaminants. The decomposition efficiency can be measured by the rate of decrease of the contaminant concentration. The devices used to quantitative measure the concentration include, for example, but are not limited to, gas chromatography, liquid chromatography, liquid chromatography-mass spectrometry, ion chromatography, chemical oxygen demand (COD) analyzer, and/or total organic carbon (TOC) analyzer, depending on the categories of the contaminants. Energy efficiency is an important factor for electrochemical treatment technologies, which usually incur a considerable energy cost. Evaluating the performance of an electrode based on its electrochemical efficiency and energy efficiency simultaneously is advantageous in selecting a practical technology. The EE/O calculation is used herein, in embodiment, to characterize the energy efficiency of the electrodes and various operational conditions. EE/O is calculated according to the following equation:

$$EE/O = \frac{U \cdot J \cdot A \cdot t}{V \cdot \log\left(\frac{C_0}{C_t}\right)};$$

where EE/O is the electrical energy required to reduce the concentration of the contaminant by one order of magnitude (kWh/m$^3$), U is the voltage (V), J is the current density (mA/cm$^2$), A is the electrode surface area (cm$^2$), t is the reaction time (h), V is the total volume of the reactor (cm$^3$), and $C_0$ and $C_t$ are the concentrations of ofloxacin at the beginning and at time t, respectively (mg/L). To assess the degradation efficiency of an electrode, the electron efficiency (EE) $\eta_c$ was calculated based on Pacheco's method [56]. Electron efficiency represents the efficiency of electrons that are used by the electrode to destroy contaminants during electrolysis. $\eta_c$ is the ratio of the rate of total organic carbon (TOC) destruction to the rate of chemical oxygen demand (COD) reduction and determines how much oxidation occurs for every electron that leaves the anode:

$$\eta_c = \frac{32}{12} \cdot \left(\frac{n}{4x}\right) \cdot \frac{d(TOC)}{d(COD)};$$

where TOC is expressed in mg (C)/L, COD is expressed in mg (O2)/L, and n is the number of electrons transferred from the anode for a complete oxidation reaction. x is the number of carbon atoms in the organic compound. The EE/O of a "super bubble" system, or wastewater treatment system according to embodiments herein, may be approximately in the inclusive range of 1.5 to 200 kWh m$^{-3}$, however, it largely depends on the concentration and the persistence of contaminants in the wastewater.

The term "electrical communication" refers to the arrangement of two or more materials or items such that electrons can be transported to, past, through, and/or from one material or item to another. Electrical communication between two materials or items can be direct or indirect through another one or more materials or items. Generally, materials or items in electrical communication are electrically conducting or semiconducting.

In some embodiments, the term "aqueous" refers to a solution where the solvent is water such that other species of the solution, or solutes, are substantially solvated by water. In some embodiments, the term "aqueous" may generally refer to a solution comprising water. Optionally, but not necessarily, an aqueous solution or an aqueous solvent includes 20 vol. % or less, optionally 15 vol. % or less, optionally 10 vol. % or less, optionally 5 vol. % or less, of non-aqueous solvent and/or solute species.

The term "pump" generally refers to an instrument that can convey a liquid or induce flow of a liquid, include any instrument conventionally referred to as a pump. The term "pumping" refers to inducing flow of a liquid, such as using a pump.

The term "at. %" refers to atomic percent, or an atomic ratio represented as a percentage.

The term "and/or" is used herein, in the description and in the claims, to refer to a single element alone or any combination of elements from the list in which the term and/or appears. In other words, a listing of two or more elements having the term "and/or" is intended to cover embodiments having any of the individual elements alone or having any combination of the listed elements. For example, the phrase "element A and/or element B" is intended to cover embodiments having element A alone, having element B alone, or having both elements A and B taken together. For example, the phrase "element A, element B, and/or element C" is intended to cover embodiments having element A alone, having element B alone, having element C alone, having elements A and B taken together, having elements A and C taken together, having elements B and C taken together, or having elements A, B, and C taken together.

The term "±" refers to an inclusive range of values, such that "X±Y," wherein each of X and Y is independently a number, refers to an inclusive range of values selected from the range of X-Y to X+Y. In the cases of "X±Y" wherein Y is a percentage (e.g., 1.0±20%), the inclusive range of values is selected from the range of X-Z to X+Z, wherein Z is equal to X·(Y/100). For example, 1.0±20% refers to the inclusive range of values selected from the range of 0.8 to 1.2.

The term "substantially" refers to a property, condition, or value that is within 20%, 10%, within 5%, within 1%, optionally within 0.1%, or is equivalent to a reference property, condition, or value. The term "substantially equal", "substantially equivalent", or "substantially unchanged", when used in conjunction with a reference value describing a property or condition, refers to a value that is within 20%, within 10%, optionally within 5%, optionally within 1%, optionally within 0.1%, or optionally is equivalent to the provided reference value. For example, a diameter is substantially equal to 100 nm (or, "is substantially 100 nm") if the value of the diameter is within 20%, optionally within 10%, optionally within 5%, optionally within 1%, within 0.1%, or optionally equal to 100 nm. The term "substantially greater", when used in conjunction with a reference value describing a property or condition, refers to a value that is at least 1%, optionally at least 5%, optionally at least 10%, or optionally at least 20% greater than the provided reference value. The term "substantially less", when used in conjunction with a reference value describing a property or condition, refers to a value that is at least 1%, optionally at least 5%, optionally at least 10%, or optionally at least 20% less than the provided reference value. As used herein, the term "about" means a range of values including the specified value, which a person of ordinary skill in the art would consider reasonably similar to the specified value. In embodiments, about means within a standard deviation using measurements generally acceptable in the art. In embodiments, about means a range extending to +1-10% of the specified value. In embodiments, about means the specified value. The terms "about" and "substantially" or "substantially equal" are interchangeable and have identical means. For example, a particle having a size of about 1 μm may have a size is within 20%, optionally within 10%, optionally within 5%, optionally within 1%, optionally within 0.1%, or optionally equal to 1 μm.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

Figure 1:
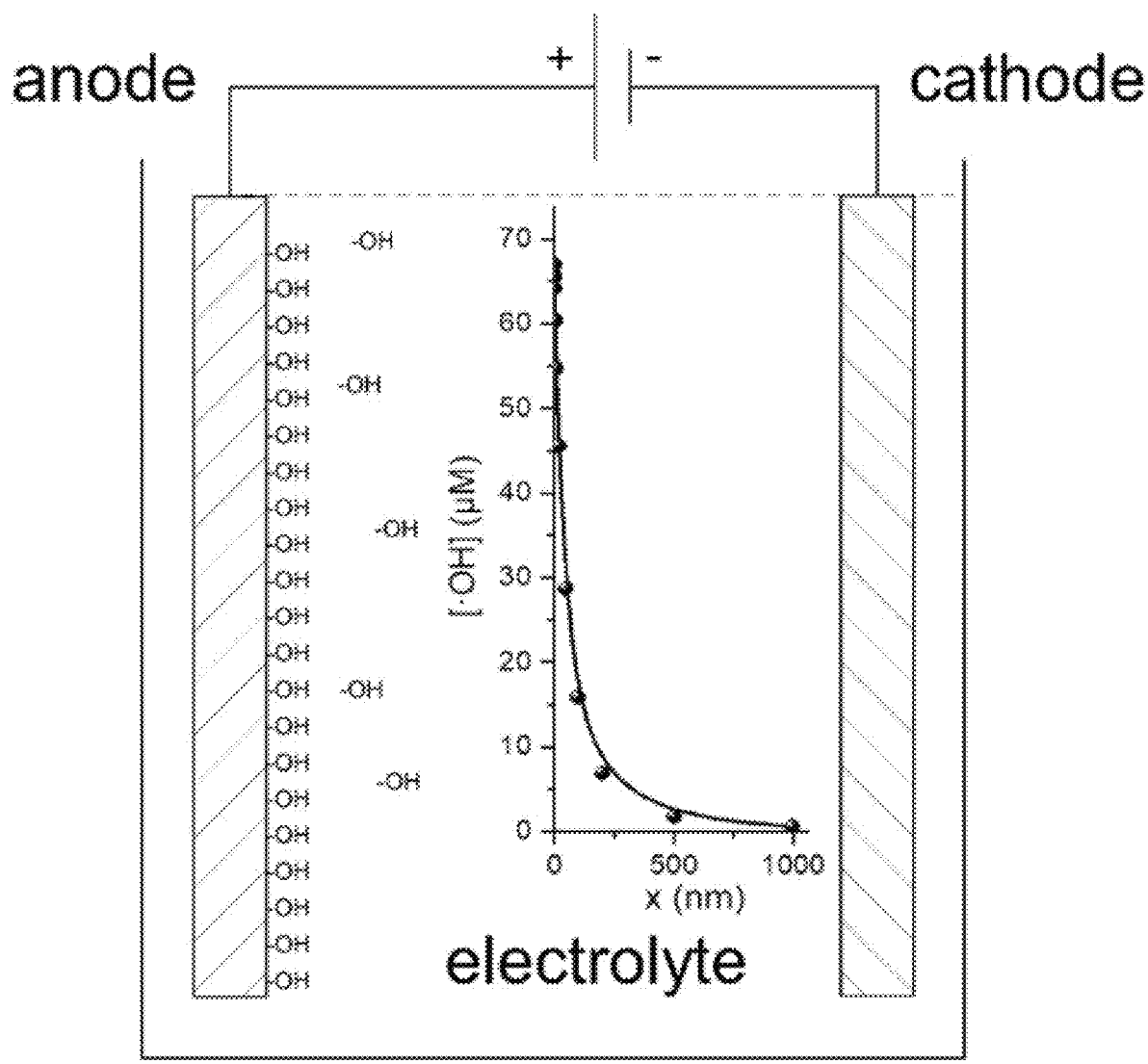
FIG. 1: The concentration profile of hydroxyl radicals in a traditional plat electrode electrocatalytic reactor.

Hydroxyl radicals are the strongest and most important oxidants for the degradation of organic pollutants during electrocatalytic AOP. However, traditional electrocatalytic electrodes are in flat or quasi-flat shape. Due to the high self-quenching rate of the hydroxyl radicals (Equation 1-3), the theoretical diffusion layer of hydroxyl radicals is only a tens or hundreds nanometers in aqueous phase; a large number of pollutants cannot fully contact with the hydroxyl radicals; the utilization rate of the hydroxyl radicals is extremely low; and the energy consumption of the electrocatalytic process is too high to be applied in high concentrated COD wastewater (as shown in the FIG. 1);

$$.OH + .OH \rightarrow H_2O_2 \quad (1)$$

$$H_2O_2 \rightarrow O_2 + 2H^+ + 2e^- \quad (2)$$

$$H_2O_2 + 2.OH \rightarrow O_2 + 2H_2O \quad (3)$$

Figure 2:
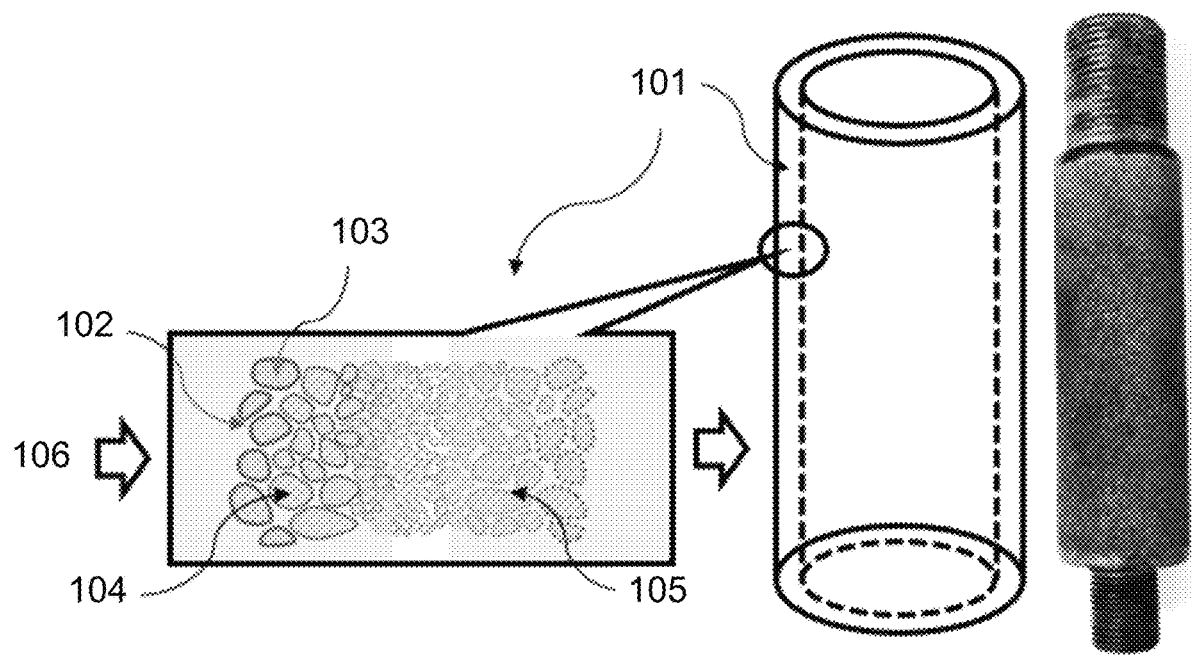
FIG. 2: A schematic (left) and an image (right) of an exemplary porous substrate, according to embodiments herein, such as an electro-photo tube (PEOT).

In aspects, systems and methods herein include an electro-photo composite catalytic reaction system capable of efficiently generating and making full use of hydroxyl radicals, which is characterized in that the main working unit is a porous electro-photo tube (PEOT) with composite catalytic activities and a large number of micron-sized channels in the wall of the tube. The outer wall of the tube and the first half of the channels are electrocatalytically active materials, and the inner wall of the tube and the second half of the channels are photocatalytically active materials (as shown in FIG. 2).

Figure 3:
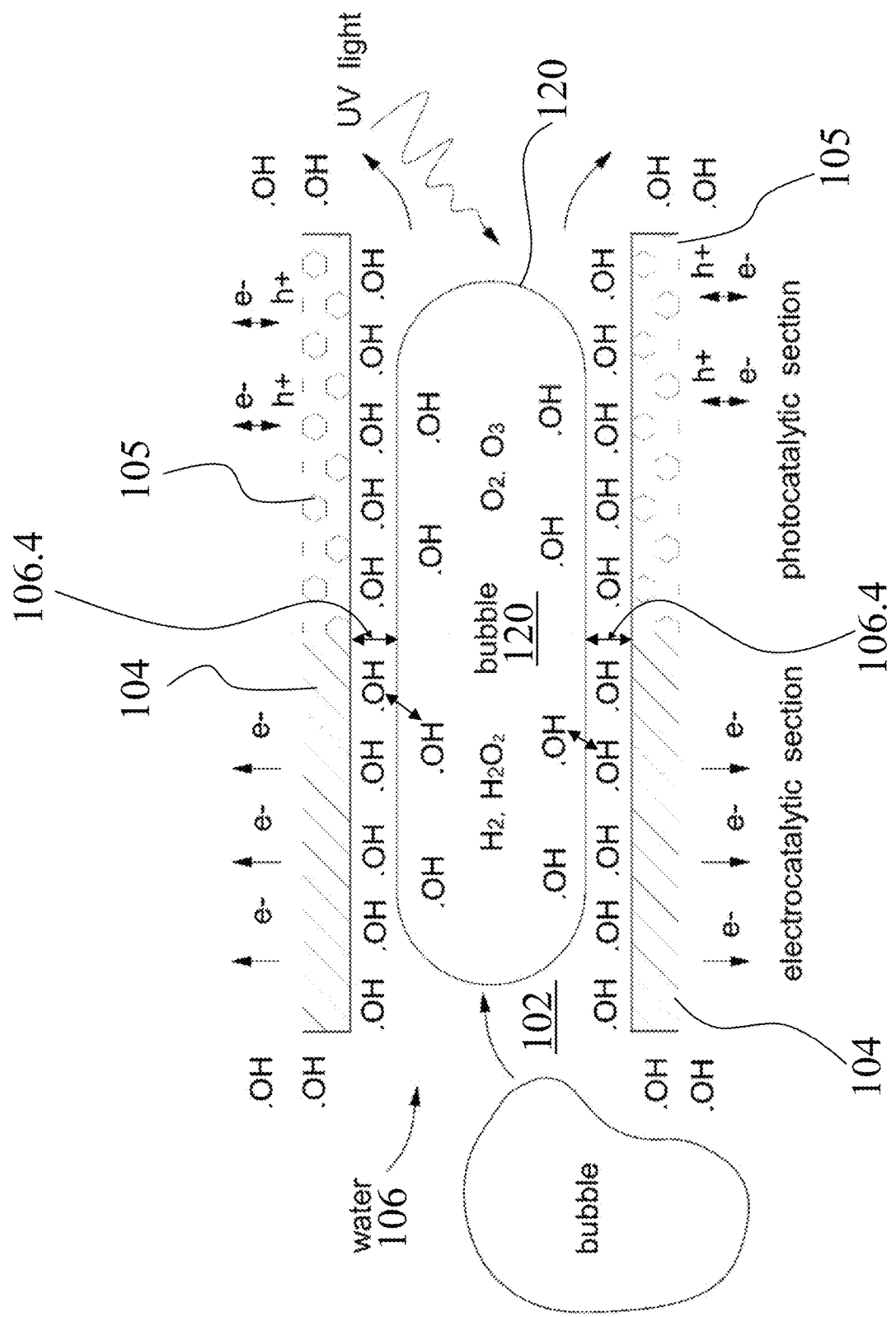
FIG. 3: A diagram showing the generation of oxygen bubbles, the generation of hydroxyl radicals, the transport of oxygen bubbles from outside of the PEOT to inside of it, the diffusion of hydroxyl radicals from aqueous phase to gaseous bubbles, and the re-excitation of $O_3$ and $H_2O_2$ in the bubbles by UV-light. As shown, hydroxyl radicals can be exchanged or transported both from the gas-phase of the oxygen bubble to the aqueous wastewater and from the aqueous wastewater to the gas-phase of the oxygen bubble.

When applying a certain pressure on the outside of PEOT to make the wastewater pass through the channels from the outside to the inside, hydroxyl radicals, by-product oxygen bubbles and a small amount of ozone are entrained into the microchannels with a diameter of several micrometers during the electrocatalysis process (as shown in FIG. 3).

The hydroxyl radicals in the water are squeezed by a large number of microbubbles close to the pore wall. There are tens to hundreds of nanometer diffusion layers for hydroxyl radicals, which can be in full contact with organic pollutants; the first half of the microchannels also has the similar electrocatalytic activity, which can continuously replenish the hydroxyl radicals consumed by quenching. Besides, with the consumption of organic pollutants in water, the concentration of hydroxyl radicals in the diffusion layer is constantly increasing; on the other hand, these large amounts of remaining hydroxyl radicals can diffuse and be stored in the bubbles in the microchannels. Considering the much longer half-life of hydroxyl radicals in air (>1 s vs. $10^{-10}$-$10^{-9}$ s in aqueous surrounding), the probability of collision of hydroxyl radicals with hydrogen peroxide in water is significantly reduced, resulting in minimized self-quenching of hydroxyl radicals; After crossing a few millimeters in thickness, the electrocatalytic layer gradually lose effectiveness, and wastewater and bubbles pass through the electrocatalytic section of the microchannel and enter the photocatalytic section. The electrocatalytic layer will lose effectiveness deeper inside the tube because the electric field intensity decreases dramatically when crossing a few millimeters in thickness. This is generally true for all porous electrode systems. The parameter to evaluate the "effectiveness" can be quantified by electrochemical active surface area (ECSA), the yield of hydroxyl radicals, and the degradation efficiency of a specific contaminant, etc. Under the excitation of ultraviolet light, the by-product ozone ($O_3$) and hydrogen peroxide ($H_2O_2$) are excited to replenish hydroxyl radicals. Therefore, different from the electrocatalytic reaction system constructed by the traditional flat electrodes, this system can maintain extremely high hydroxyl radical concentration levels not only on the outer wall of the PEOT, but also in the microchannels, and inside the PEOT, and achieve close contact between organic pollutants and highly concentrated hydroxyl radicals. By this means, the availability of hydroxyl radicals greatly enhanced.

Figure 4:
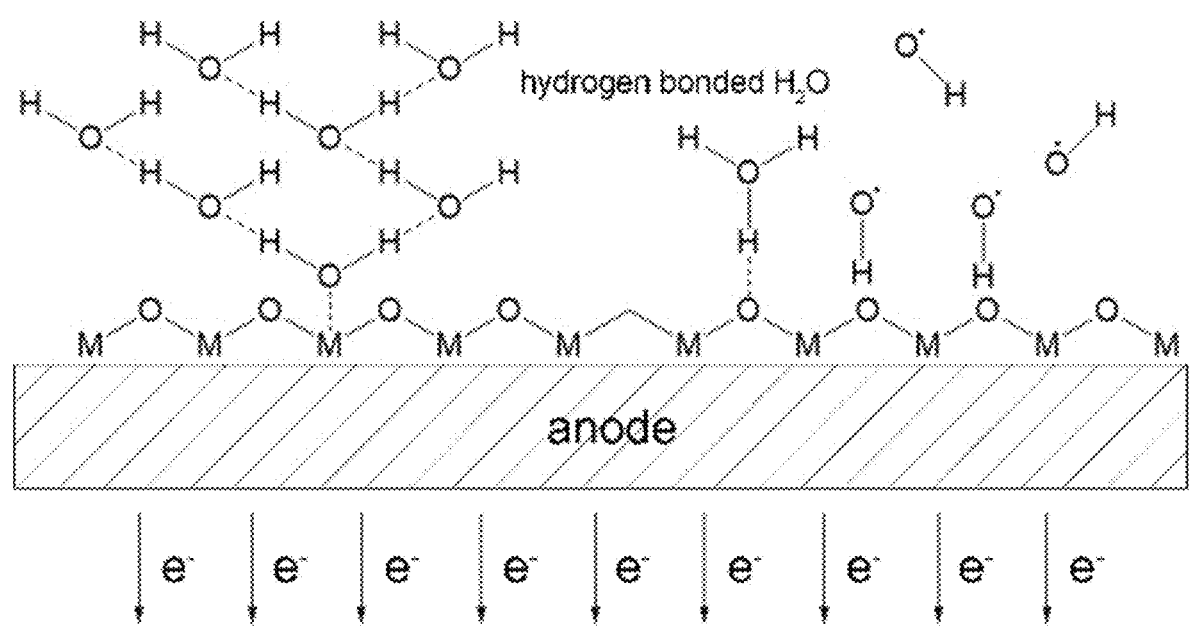
FIG. 4: An illustration of exemplary compositions and process of generation of hydroxyl radicals occurring on a pore surface of an internal porous region having the electrocatalytic material, according to embodiments herein, also referred to as the electrocatalytic portion or electrocatalytic section of wastewater treatment systems disclosed herein. The illustrations shows generation of hydroxyl radicals on the surface of electrocatalytically active sites of metal (M) oxides anodes.

More specifically, the mechanism of hydroxyl radical evolution includes, in embodiments: electron-loss conversion of hydroxyl groups adsorbed on the surface of inactive anode metal oxide (the active layer on the outer wall of the tube and the channel electrocatalytic section, as shown in FIG. 4).

Figure 5:
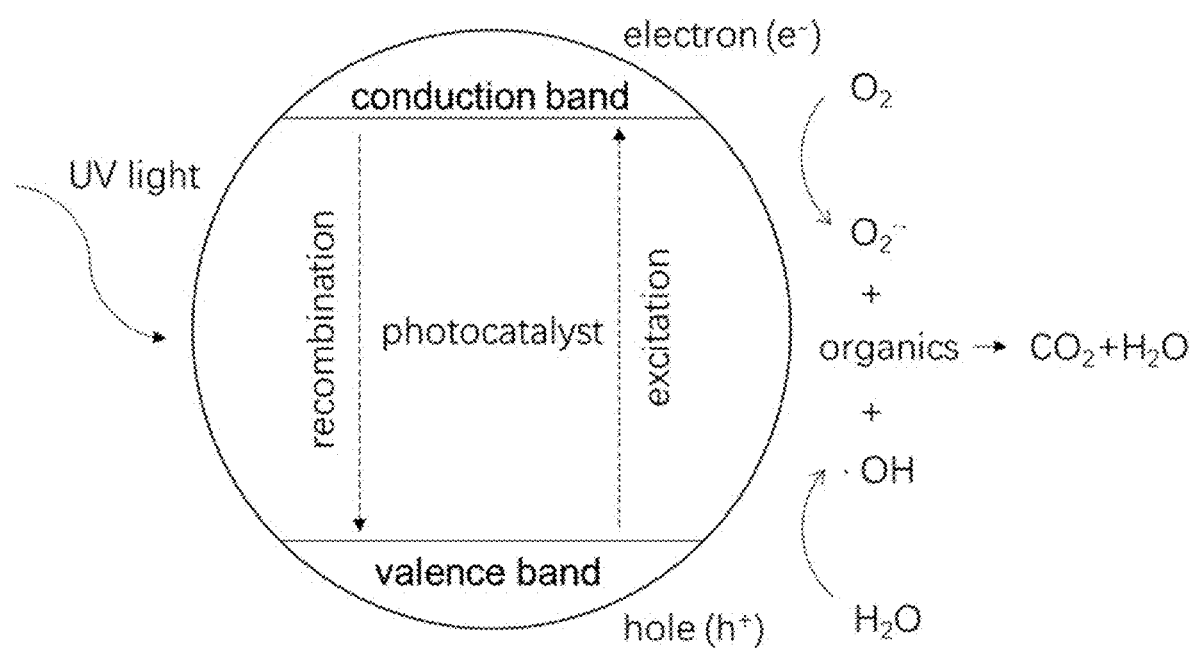
FIG. 5: An illustration of exemplary compositions and process of generation of hydroxyl radicals occurring on a pore surface of an internal porous region having the photocatalytic material, according to embodiments herein, also referred to as the photocatalytic portion or photocatalytic section of wastewater treatment systems disclosed herein. The illustrations show generation of hydroxyl radicals on the surface of photocatalytically active sites, as well as the by-products.

The generation of hydroxyl radicals excited by UV-light on the photocatalyst (the inner wall of the tube and the photocatalytic section in the microchannels, as shown in FIG. 5).

In addition, the ozone and hydrogen peroxide are by-produced on the electrocatalytic anode and then transformed into hydroxyl radicals under UV-light excitation (as shown in Equation 1, 4-8).

$$.OH + .OH \rightarrow O_2 + 2H^+ + e^- \quad (4)$$

$$.OH + O_2 \rightarrow HO_3. \quad (5)$$

$$HO_3. \rightarrow O_3 + H^+ + e^- \quad (6)$$

$$O_3 + H_2O + h\nu \rightarrow H_2O_2 + O_2 \quad (7)$$

$$H_2O_3 + h\nu \rightarrow 2.OH \quad (8)$$

1. The production mechanism of oxygen bubbles in water may include: the anode oxygen evolution reaction in the electrocatalytic process. Oxygen are adsorbed on the anode surfaces in the beginning, and gradually accumulate to the micro bubbles, and gather to form larger bubbles and detach from the electrode surface;

2. The mechanism of water-entrained gas bubbles passing through the porous tube may include: applying a certain pressure outside the PEOT to inhibit the growth and nucleation of oxygen bubbles, and small air bubbles entrained into the microchannels under the entrainment of high-speed water flow. The gas bubbles then pass through the electrocatalytic section and the photocatalytic section. The space close to the wall of the channels has a higher concentration of hydroxyl radicals and organic pollutants, which is the main area for their reaction; the role of the bubbles is to squeeze the microchannels to limit the thickness of the water film to a few nanometers, increase the concentration of hydroxyl radicals and suppress its self-quenching, and store excess hydroxyl radicals and ozone;

3. The microchannel design also has various bonus such as electro-floatation, electro-polymerization, electric filtration, and electro-dialysis; UV radiation also has strong sterilization and algae killing capabilities. These bonus are combined with the main hydroxyl radical oxidation capabilities, which can efficiently purify the oxidation of organic wastewater.

4. No matter how stable the electrochemically active coating on the surface of the PEOT is, there is a certain degree of oxidative corrosion, leading to the leaching of metal ions. The porous structure and the implementation mode of water flow from the outside to the inside can minimize the release of the metal ions from outer wall of the PEOT. The metal ions can be re-deposited onto the microchannels, and the electrocatalytic oxide layer can be reconstructed to strengthen the electrocatalytic activity of the channels, while preventing ion loss and secondary pollution.

Advantages of the systems and methods disclosed herein include: on the surface of PEOT, improved mass transfer between organic species and electrode surface; in microchannels, electrocatalytic section, electrocatalytic active sites on the inner wall of the channels continue to provide mass of .OH to maintain continuous consumption of organic species; in microchannels, electrocatalytic section, each organic species is confined in a high-concentration .OH layer between the channel wall and the oxygen bubbles; in microchannel, electrocatalytic section, excess .OH diffuse and store in oxygen bubbles, and avoid the self-quenching reaction; in microchannel, photocatalytic sectionc, $O_3$ and $H_2O_2$ further generate .OH under UV excitation to maintain a stable .OH concentration; improved stability, where leached metal ions re-deposit on the internal powders; and compatible fabrication techniques include electropolymerization, electrocoagulation, electroflotation, electrofilter, direct oxidation, electroreduction.

For current wastewater treatment technology, cost and efficiency are priorities. Biotechnology certainly has the lowest processing cost, but it requires large and complex reactor designs, a large footprint, advanced maintenance experience, and high maintenance costs. This is not suitable for the remote, off-grid and lack technical support area and industries. The only thing electrochemical and photochemical technology needs is the support of electricity. This is easy to be obtained by photovoltaic power. They also require low maintenance, and do not require bacteria or any chemicals such as the sludge and nutrients, so subsequent operation and maintenance is very simple; but so far the biggest problem of electrochemistry and photochemistry is the extremely low utilization of hydroxyl radicals, resulting in high energy consumption, and a key important contribution of the presently disclosed systems and methods is that they can significantly improve the utilization of hydroxyl radicals to achieve efficient removal of organic pollutants.

Applications of the systems and methods disclosed herein include residential, commercial, municipal, healthcare, and industrial wastewater treatment. Particular examples include, but are not limited to, pretreatment (improving biodegradability) or direct treatment of domestic sewage, human waste, aquaculture sewage, landfill leachate, industrial organic sewage (including petroleum, petrochemical, textile and dyeing, pharmaceutical, etc.), Or advanced treatment of wastewater produced by waste water treatment plant (secondary biochemical effluent or concentrated RO water).

Figure 6:
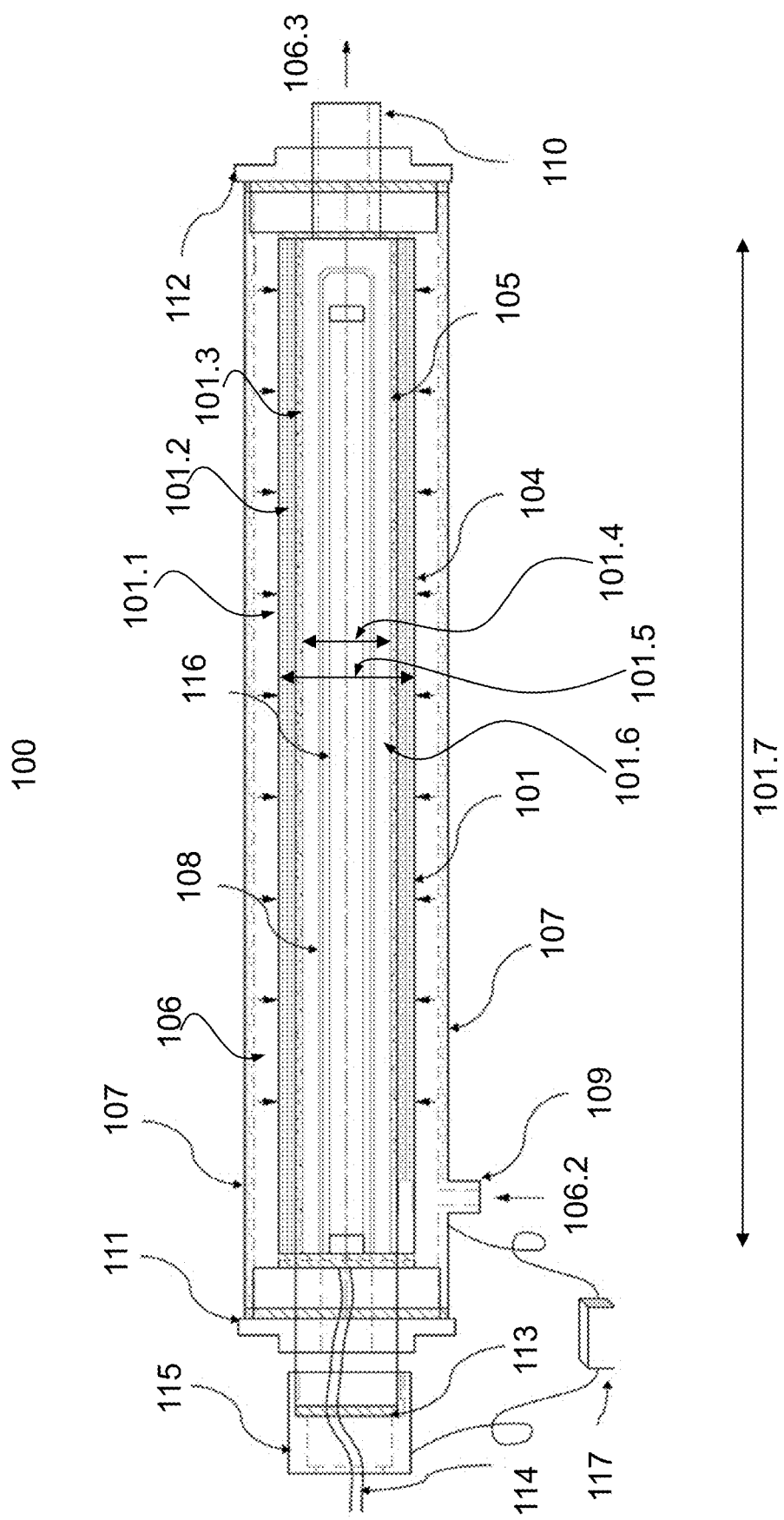
FIG. 6: The diagram of a wastewater treatment system, according to various embodiments disclosed herein.
Figure 7:
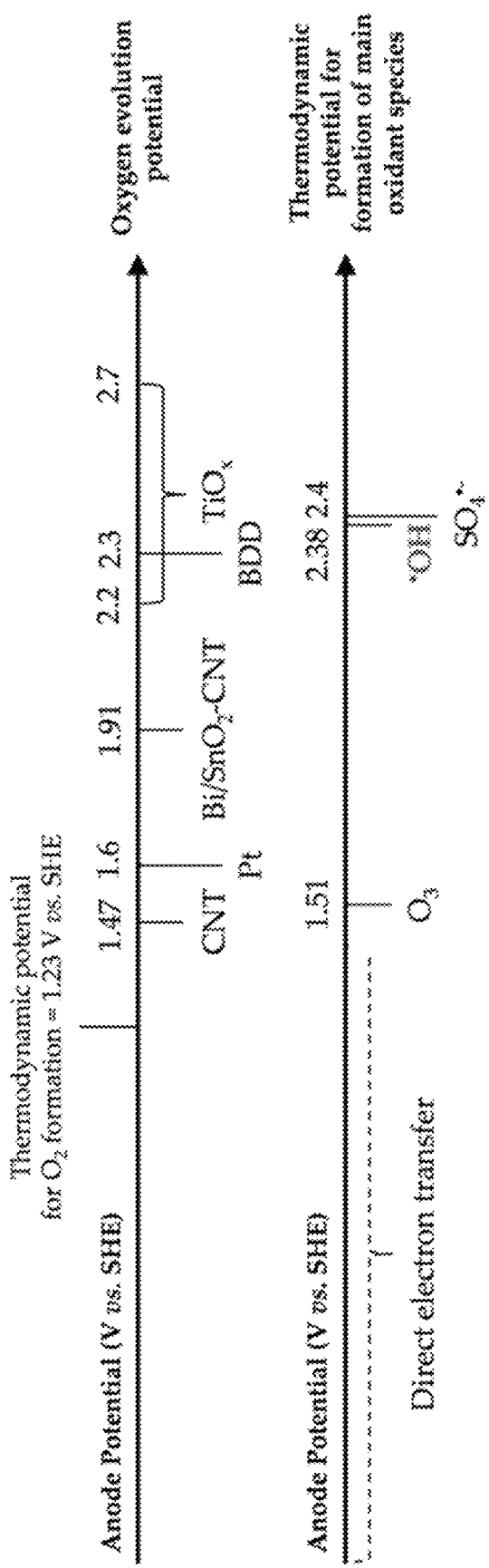

Exemplary Configurations of Wastewater Systems Disclosed Herein, According to Various Embodiments A wastewater advance treatment process can be performed using the "super bubble" electro-photo hybrid catalytic systems disclosed herein. FIG. 6 is a schematic of an exemplary wastewater treatment system, according to various embodiments herein. In the system of FIG. 6, the wastewater is first injected into the "super bubble" electro-photo reactor (SBEPR), pass through the PEOT, and then enter the UV light irradiation area. Hydroxyl radicals are generated under the excitation of UV-light irradiation, and the wastewater is further treated, and finally purified water is obtained.

More particularly, wastewater treatment system 100 of FIG. 6, also optionally referred to as a "super bubble" electro-photo reactor (SBEPR), comprises a porous substrate 101, optionally in the form of a porous tube (or, porous electro-photo tube (PEOT)), a photocatalytic material 105 (also referred to as a photocatalytically active material), optionally an electrocatalytic material 104 (also referred to as an electrocatalytically active material), and flowing wastewater 106. Porous substrate 101, here shown as a porous tube, for example, comprises a first external surface 101.1, an internal porous region 101.2, and a second external surface 101.3. For example, electrocatalytic material 104 is immobilized on at least a portion of the first external surface 101.1 and/or in at least a portion of the internal porous region 101.2. For example, photocatalytic material 105 is immobilized on at least a portion of the second external surface 101.3 and/or in at least a portion of the internal porous region 101.2. Preferably, at least some of each of the electrocatalytic material 104 and the photocatalytic material 105 is independently immobilized in at least a portion of internal porous region 101.2. Portions of each of electrocatalytic material 104 and photocatalytic material 105 immobilized in internal porous region 101.2 are immobilized on surfaces of pores of the internal porous region. For example, at least a portion of electrocatalytic material 104 may be immobilized on pore surfaces in a portion of the internal porous region 101.2 that is nearest to first external surface 101.1. For example, at least a portion of photocatalytic material 105 may be immobilized on pore surfaces in a portion of the internal porous region 101.2 that is nearest to second external surface 101.2. One of skill in the art will appreciate that system 100 may be configured with a variety of variations not depicted in FIG. 6. For example, system 100 may optionally comprise photocatalytic material 105 throughout internal porous region 101.2, with system 100 or internal porous region 101.2 optionally being free of electrocatalytic material 104. In embodiments, both external sides of the porous tube are coated with catalytic materials, which generate the hydroxyl radicals continuously, and facilitate in maintaining their activity while they cross the pores (channels).

FIG. 2 may be viewed together with FIG. 6 for further exemplary illustration of embodiments of the systems and methods disclosed herein. FIG. 2 is a schematic (left) and an image (right) of an exemplary porous substrate, such as an electro-photo tube (PEOT). Porous substrate 101, or internal porous region 101.2 thereof, is optionally formed of or comprises particles (e.g., conductive particles; e.g., titanium particles) 103. Spaces between particles 103 may form pores or microchannels 102, granting the porosity of porous internal region 101.2. Wastewater 106 flows through the pores or microchannels 102, together with electrocatalytically and/or photocatalytically generated oxygen bubbles. Particles 103 may be at least partially coated with (or have immobilized thereon) electrocatalytic material 104 and/or photocatalytic material 105. For example, FIG. 2 shows a cross-sectional schematic of porous substrate 101 and internal porous region 101.2 wherein the leftside (optionally corresponding to the input wastewater side) comprises particles 103 with electrocatalytic material 104 immobilized thereon and wherein the rightside (optionally corresponding to the output wastewater side) comprises particles 103 with photocatalytic material 105 immobilized thereon. Porous substrate 101 may be formed by any relevant technique in the art such that porous substrate 103 may comprise pores or microchannels 102, with electrocatalytic material 104 and/or photocatalytic material 105 immobilized on surfaces thereof, without necessarily the presence of particles 103. FIG. 2 also illustrates a large-small-large pore size distribution, wherein, viewed from left to right, pores or microchannels 102 are first large (nearest to input wastewater or first external surface), then small (in a middle region of internal porous region), then again large (nearest to output wastewater or second external surface).

FIG. 3 is an illustration of an oxygen bubble 120 that is generated in system 100 (optionally, "generated oxygen bubble"), which is generated electrocatalytically at the electrocatalytic material or photocatalytically at the photocatalytic material. In the exemplary case illustrated in FIG. 3, oxygen bubble 120 is generated at the electrocatalytic material and flows through a pore/microchannel 102 of internal porous region 101.2. Oxygen bubble 120 may store/comprise generated hydroxyl radicals in its gas-phase and exchange the generated hydroxyl radicals with the layer of wastewater (optionally, "liquid layer" or "liquid wastewater layer") formed between the oxygen bubble 120 and the adjacent or nearest surface of pore/microchannel 102. The layer of wastewater is characterized by an average thickness 106.4.

Porous substrate 101 is optionally, such as when configured as a tube as shown in FIG. 6, characterized by an internal diameter 101.4, an outer diameter 101.5, and an internal cavity 101.6 defined by internal diameter 101.4 and a length 101.7 of the porous tube. System 100 comprises a light source 116. Light source 116 is optionally a UV (ultraviolet) light source. As depicted in FIG. 6, system 100 comprises light source 116 within internal cavity 101.6 of porous substrate 101, which is facilitated by the light source being optionally configured in a cylindrical or tube shape, such that light source 116 and its emitted light is nearest to and incident on, respectively, second external surface 101.3. With the configuration depicted in FIG. 6, light source 116, optionally protected by light-transparent enclosure 108, is positioned in the center of the porous tube 101, which allow wastewater 106 to flow through the porous tube such that the photocatalytic material as well as optionally compositions of the wastewater may be excited by the irradiation of light source 116 (e.g., UV-light). One of skill in the art will appreciate that variations on the configuration or arrangement of elements of system 100 are possible without deviating from the scope herein. For example, light source 116 may optionally be positioned nearest to first external surface 101.1 such that emitted light is incident on first external surface 101.1. An optional arrangement for achieving the latter optional embodiment is by having one or more light source 116 at least partially surrounding or arranged around porous substrate 101, for example. Optionally, system 100 may comprise two or more light source 116 together emitting light onto both first external surface 101.1 and second external surface 101.3. Optionally, in the latter embodiment, system 100 may comprise photocatalytic material 105 in internal porous region 101.2 both near first external surface 101.1 and near second external surface 101.3, and optionally comprise photocatalytic material 105 on either or both of first external surface 101.1 and second external surface 101.3.

Wastewater 106 comprises one or more contaminants. Input wastewater 106.2 flows into the system and output wastewater 106.3 flows out of the system. System 100 has a flow direction of wastewater as indicated via input wastewater 106.2, output wastewater 106.3, as well as the little flow arrows shown pointing toward the center axis of the porous substrate 101. However, one of skill would appreciate that a different flow direction and appropriate arrangement of components is available, without deviating from the scope herein.

Optional components of system 100 include enclosure 107 (also referred to as a shell of the PEOT reactor), light-transparent enclosure (e.g., glass or quartz tube) 108, wastewater inlet 109, wastewater outlet 110, sealing cap (upper) 111, sealing cap (bottom) 112, sealing ring 113, electronic wire 114, upper cap 115, and power supply (e.g., DC) 117. Light source 116 is optionally not in contact with wastewater 106. Glass or quartz tube 108 and upper cap 115 facilitate water-proofing of light source 116 to prevent electrical shorting or degradation of light source 116. Power supply 117 may be used to provide electricity for the electrocatalysis process and/or the UV-light 16.

The porous substrate 101, optionally configured as porous electro-photo tube, may be configured as an anode with anodic bias applied thereto. System 100 may comprise a counter electrode or cathode, which is optionally enclosure 107, which may be formed of a metal material such as stainless steel. Wherein system 100 comprises electrocatalytic material 104, such as depicted in FIG. 6, electrocatalytic material 104 is in electrical communication with porous substrate 101 such that application of anodic bias to porous substrate 101 subjects electrocatalytic material 104 to an anodic bias. Anodic bias is not necessarily uniformly or equivalently distributed at all portions of the porous substrate 101 or electrocatalytic material 104. As depicted, a gap or separation distance exists between porous substrate 101, or first external surface thereof, for example, and a nearest surface of enclosure 107. The gap or separation distance is optionally selected from the range of 0.1 mm to 100 cm, optionally 1 mm to 100 mm, optionally 5 mm to 7 mm.

In a non-limiting illustrative example, operation of the system may occur as follows. When a domestic wastewater is treated by wastewater treatment system 100, first, a pressure device (such as a pressure tank, or a delivery pump) is connected to the water inlet 109. An electric field is established between the porous substrate tube 101, under anodic bias, and the enclosure 107, under cathodic bias, by a DC power supply 117. The domestic wastewater 106 with organic pollutant flows radially inward through the outer wall of the porous substrate tube 101, finishing preliminary treatment; then, the wastewater flow entrains air bubbles through the porous substrate tube 101 and enters the internal ultraviolet irradiation zone, the internal/inner cavity 101.6; the microchannels 102 on the porous substrate tube 101 can also serve as a microfiltration membrane to achieve efficient filtration and remove large particle and polymer floc generated by domestic wastewater. The UV irradiation is provided by a UV lamp 116. The re-generated hydroxyl radicals attack and mineralize the organic pollutants in wastewater thoroughly, and then the clean treated water is discharged through the outlet 110.

The invention can be further understood by the following non-limiting examples.

Example 1: Which Anodic Material Can Generate Hydroxyl Radicals During an Electrocatalytic Process?

During an electrocatalytic process, the hydroxyl radicals can be generated on the surface of an anode by applying certain cell voltage between anode and cathode. The anodic potential and the anode are the most critical.

The lower or higher anodic potential (equal to cell voltage under certain condition) cannot yield hydroxyl radical. Considering that free hydroxyl radicals are formed in acid aqueous solution according to Eq (1) (A. Kapalka et al. Electrochimica Acta 54 (2009) 2018-2023), it is possible to calculate the thermodynamic standard potential of its formation using Eq (2-5). The calculated standard potential of 2.38 eV which is the minimum applied potential required to generate hydroxyl radicals is high for a commercial anode.

$$H_2O(l) \rightarrow \cdot OH(aq) + e^- \quad (1)$$

$$E_0 = \Delta G^0_r/ZF \quad (2)$$

$$\Delta G_{H_2O} = -237.178 \text{ kJ mol}^{-1} \quad (3)$$

$$\Delta_i G_{\cdot OH} = -7.74 \text{ kJ mol}^{-1} \quad (4)$$

$$E_{0(\cdot OH)} = 2.38 \text{ eV} \quad (5)$$

$$H_2O(l) \rightarrow H_2 + \tfrac{1}{2}O_2 \quad (6)$$

$$E_{0(O_2)} = 1.51 \text{ eV} \quad (7)$$

Under the high anodic potential, many commercial anodes will be unstable and easy to be deactivated or degraded in a short time (<1000 h), including graphite, almost all metal, ATO/NATO and Ir—Ru—Ti—O (as stated by US2020/0407248). Till date, only $PbO_2$ and boron-doped diamond (BDD) can survive under such a high potential and last a long time (>5000 h).

On the other hand, the selectivity of the anodic materials is more important for generation of hydroxyl radical. In other words, the commercial anodes, including ATO/NATO and Ir—Ru—Ti—O, even if they can survive under the potential, cannot yield enough hydroxyl radicals for efficient water treatment. The selectivity can be quantitatively assessed by the oxygen evolution potential (OEP) (Table 1 and FIG. 1). An anode with lower OEP can only generate oxygen or chlorine, rather than hydroxyl radicals, even if applied a high anodic potential. On the other hand, an anode with higher OEP can generate more hydroxyl radicals, such as $PbO_2$ and BDD anodes. BDD anodes are too expensive and very hard to be fabricated. Therefore, the $PbO_2$ based anode is the best choice for our present designs.

TABLE 1

Comparison of different anodes being focused on recently.

| Electrode | Advantages | Disadvantages | Compared to other electrodes | Oxygen evolution potential (V vs. SHE) |
|---|---|---|---|---|
| Graphite | Low cost | Unstable | | 1.43 |
| Carbon nanotube | Expensive | Unstable | | 1.47 |
| Pt | Inert, low oxygen. Evolution overpotential | Expensive | Poor efficiency in anodic oxidation of organic compounds | 1.62 |
| Ir—Ru—Ti—O | | | | 1.52 |
| $PbO_2$ | Good current efficiency, cheap, effective in oxidizing pollutants, high oxygen evolution overpotential, easy to prepare | Friability | Higher activity | 2.20 |
| Doped $SnO_2$ (ATO or NATO) | Supports indirect oxidation, good current efficiency, high oxygen evolution overpotential, lower cost, higher availability | Short lifespan, lack of electrochemical stability | Higher activity | 1.67 |
| Boron-doped diamond | Inert under tough conditions, high oxygen evolution overpotential and electrochemical stability, good current efficiency, high corrosion stability, good conductivity | Very expensive | Higher activity | 2.30 |

Example 2: Why are the Hydroxyl Radicals Short-Lived in an Ordinary Electrocatalytic Process?

Hydroxyl radical (.OH) is a very active oxidizing radical, and its standard electrode potential (2.80 V) is only inferior to fluorine (2.87 V). The rate constant of reaction with organic matter is large, generally in $10^6 \sim 10^{10}$ mol $L^{-1}$ $s^{-1}$. It is unselective: almost all organic matter can be oxidized. It is also short-lived: hydroxyl radical lifetime is different in different environmental media, but generally less than $10^{-4}$ s. The typical kinetics of hydroxyl radical related reactions occur in an electrocatalytic environment are as follows (Table 2 and Eq (8-12)):

TABLE 2

Typical reaction for the generation and quenching of hydroxyl radicals.

| Reactions | Kinetics parameter |
|---|---|
| $S + H_2O\ (l) \to S\ (H_2O)_{ad}$ | $k_1(m\ ^{s-1}) = 2.83 \times 10^{-5}$<br>$k_{-1}(m^{s-1}) = 3.95 \times 10^{-3}$ |
| $S\ (H_2O)_{ad} \to S\ (\bullet OH)_{ad} + H^+_{(ac)} + e^-$ | $k_2(mol\ m^{-2\ s-1}) = 3.23 \times 10^{-9}$<br>$k_{-2}(mol\ m^{-2\ s-1}) = 0.76$ |
| $S\ (\bullet OH)_{ad} \to S(\bullet O)_{ads} + H^+_{(ac)} + e^-$ | $k_3(mol\ m^{-2\ s-1}) = 2.72 \times 10^{-3}$<br>$k_{-3}(mol\ m^{-2\ s-1}) = 4.01 \times 10^{-6}$ |
| $S\ (\bullet OH)_{ad} \to SO_x + H^+_{(ac)} + e^-$ | — |

TABLE 2-continued

Typical reaction for the generation and quenching of hydroxyl radicals.

| Reactions | Kinetics parameter |
|---|---|
| $S(\bullet O)_{ads} + H_2O \to S(\bullet OOH) + H^+_{(ac)} + e^-$ | $k_4(mol\ m^{-2\ s-1}) = 1.17 \times 10^{-17}$<br>$k_{-4}(mol\ m^{-2\ s-1}) = 4.01 \times 10^{-6}$ |

TABLE 2-continued

Typical reaction for the generation and quenching of hydroxyl radicals.

| Reactions | Kinetics parameter |
|---|---|
| $S(\bullet OOH)_{ads} \to S(O_2)_{ads} + H^+_{(ac)} + e^-$ | $k_5(mol\ m^{-2\ s-1}) = 5.95 \times 10^{-19}$<br>$k_{-5}(mol\ m^{-2\ s-1}) = 4.01 \times 10^{-6}$ |
| $S(O_2)_{ads} \to S + O_2\ (g)$ | $k_5(mol\ m^{-2\ s-1}) = 0.487$ |
| $O_2 + e^- \to O_2^-$ | — |
| $O_2^- + H_2O_2 \to O_2 + OH + OH^-$ | — |
| $\bullet OH + H_2O_2 \to H_2O + HOO\bullet$ | $k_5(S^{-1}\ s^{-1}) = 3.3 \times 10^7$ |
| $SO_4^{\bullet 2-} + OH^- \to HO\bullet + SO_4^{2-}$ | $k_5(S^{-1}\ s^{-1}) = 6.5 \times 10^7$ |
| $H_2O_2 + OH \to HO_2 + H_2O$ | $k_5(S^{-1}\ s^{-1}) = 1.2 \sim 4.5 \times 10^7$ |

*S means the substantial surface of an anode.

$$S(.OH)_{ad} + R \to S + CO_2 + nH_2O + e^- \qquad (8)$$

$$SO_x + R \to S + RO_x \qquad (9)$$

$$.OH + .OH \to H_2O_2 \qquad (10)$$

$$H_2O_2 \to O_2 + 2H^+ + 2e^- \qquad (11)$$

$$H_2O_2 + 2.OH \to O_2 + 2H_2O \qquad (12)$$

Example 3: Why is the Theoretical Diffusion Layer of Hydroxyl Radicals so Limited?

According to the literature report, at current density (j=300 A $m^{-2}$), the reaction layer thickness is about 1 μm whereas the maximum (surface) concentration of hydroxyl radicals reaches the value of several tenths of μM (Quim. Nova vol. 34 no. 5 São Paulo 2011). It can be calculated by the concentration profile of hydroxyl radicals on anodes:

By applying one-dimensional Fick law referred to the molecular diffusion in a stagnant layer, the mass balance for hydroxyl radicals in an element of width $\Delta x$ can be expressed as:

$$-D_{HO\bullet}\left[\frac{dc_{HO\bullet}}{dx}\right]_x - 4k_{HO\bullet}c_{HO\bullet}^2 \bullet \Delta x = -D_{HO\bullet}\left[\frac{dc_{HO\bullet}}{dx}\right]_{x+\Delta x}$$

where $D_{HO.}$ (m$^2$ s$^{-1}$) is the diffusion coefficient of HO., $k_{HO.}$ (m$^3$ mol$^{-s-1}$) is the rate constant of reaction, and $c_{HO.}$ (mol m$^{-3}$) is the concentration of HO.. If x goes to 0, we can write $$D_{HO\bullet}\frac{d^2 c_{HO\bullet}}{dx^2} = 4k_{HO\bullet}c_{HO\bullet}^2$$

Considering these boundary conditions, the solution of differential equation gives the concentration profile of hydroxyl radicals, as a function of the distance x from the electrode surface, during oxygen evolution:

$$c_{HO\bullet} = \frac{3D_{HO\bullet}}{2k_{HO\bullet}(x + \sqrt{3D_{HO\bullet}(2k_{HO\bullet}c_{HO\bullet}^s)})^2}$$

The gradient of the concentration can be expressed as:

$$\frac{dc_{HO\bullet}}{dx} = \frac{-3D_{HO\bullet}}{k_{HO\bullet}(x + \sqrt{3D_{HO\bullet}/2k_{HO\bullet}c_{HO\bullet}^s})^3}$$

It is possible to calculate the flux of hydroxyl radicals at the electrode surface, as given by the following equation:

$$[J_{HO\bullet}]_{x=0} - D_{HO\bullet}\left[\frac{dc_{HO\bullet}}{dx}\right]_{x=0} = 1.63\sqrt{(c_{HO\bullet}^2)^3 k_{HO\bullet}D_{HO\bullet}}$$

The flux of hydroxyl radicals at the electrode surface can also be expressed in terms of the current density j:

$$[J_{HO\bullet}]_{x=0} = \frac{j}{F}$$

Therefore, the surface concentration of hydroxyl radicals during oxygen evolution (OER) can be obtained:

$$c_{HO\bullet_{OER}}^2 = \sqrt[3]{\frac{j^2}{2.67F^2 k_{HO\bullet}D_{HO\bullet}}}$$

FIGS. 8A-8B show calculated concentration profiles of different species in a traditional plat electrode electrocatalytic reactor. FIG. 8A is a plot of calculated concentration profile of hydroxyl radicals. FIG. 8B is a plot of concentration profile of different carbohydrate molecules as simulated pollutants. The two plots are calculated using the rate constant k specified as shown in the figures. FIG. 8A is under the condition where no carbohydrate substrate exists. Each line in FIG. 8B is generated under the condition that only that particular carbohydrate species exists. All other conditions or parameters between 8A and 8B are assumed to be identical.

The aqueous radical chemistry is quite complex. There are many kinds of free radicals that can exist water, including, superoxide ($O_2.^-$), hydroxyl radicals (.OH), nitric oxide (NO), singlet oxygen ($^1O_2$), hydroperoxyl (HOO.), nitrogen dioxide ($NO_2$), and peroxynitrite (ONOO$^-$), hydrogen peroxide ($H_2O_2$), alkoxy radical (RO.), peroxy radical (ROO.), etc. They are generated under different conditions with higher or lower oxidative potentials, which results in the reactions with the species in water, and their inter-reactions each other. Therefore, we can only consider the instantaneous concentration and diffusion distance of fee radicals semi-quantitatively. The calculated concentration profile of hydroxyl radicals (FIG. 8A) is an ideal state, rather than where it is in an actual state. It is noted that, other radical species other than hydroxyl radicals, such as those with longer half-lives and longer diffusion distances than hydroxyl radicals, may not necessarily be subject to the principle used in calculating FIGS. 8A-8B. But on the other hand, these free radicals do not have such a strong oxidation ability to attack the organic pollutants compared to hydroxyl radicals. Such non-hydroxyl free radicals can only oxidize some "weak" organic matter, but are unavailable to the more persistent organic matter or very low concentration of pollutants. Therefore, for wastewater treatment, these non-hydroxyl free radicals are very inefficient for some persistent pollutants and micropollutants and so are generally not considered in calculations or simulations.

Example 4: How and Why Can "Super Bubble" Shield Hydroxyl Radicals?

Hydroxyl free radical is a kind of oxidizing free radicals is very lively, but easily deactivation in aqueous solution, this has been a lot of experiments have established that, but in the air, the half-life of hydroxyl radicals can reach as high as $10^{10}$ times its life in the water, with lifetime extending upwards of 1 s (Table 3). This extended lifetime can assure that the hydroxyl radicals react with target contaminants adsorbed on the bubbles or at the gas-liquid interface, rather than being rapidly quenched in water.

TABLE 3

The oxidative potential and half-life of reactive oxygen radicals/species.

| Free radicals | Oxidative potential (V) | Half-life |
|---|---|---|
| •OH (in water) | 1.89 (alkaline)~2.72 (acidic) | $10^{-10}$~$10^{-9}$ s |
| •OH (in air) | | >1 s |
| $SO_4\bullet^-$ | 2.5~3.1 | $3\times 10^{-5}$~$4\times 10^{-5}$ s |
| O | 2.42 | |
| $O_3$ | 1.24 (alkaline)~2.07 (acidic) | 15 min |
| $S_2O_8^{2-}$ | 2.01 (acidic) | Stable |
| RO• | | $10^{-6}$ s |
| ROO• | | 17 s |
| $O_2\bullet^-$ | | $10^{-6}$ s |
| $H_2O_2$ | 0.85 (alkaline)~1.78 (acidic) | Stable |
| $^1O_2$ | | $10^{-6}$ s |
| $SnO_4^-$ | 0.58 (alkaline)~1.68 (acidic) | Stable |
| $ClO_2$ | 1.57 | Stable |
| $Cl_2$ | 1.36 | Stable |
| HOCl | 0.95 | Stable |

Example 5: Some Water Treatment Cases of the "super-Bubble" Catalytic System FIGS. 9-10 show exemplary, non-limiting, dimensions of a wastewater treatment system, according to certain embodiments disclosed herein. The system of FIGS. 9-10 comprises a porous tube, shown in FIG. 9, corresponding to the porous substrate and which configured as an anode by having anodic bias applied thereto. The system of FIGS. 9-10 comprises a cylindrical enclosure, shown in FIG. 10, such as a stainless steel casing, enclosing or surrounding the porous tube of FIG. 9 and being subject to a cathodic bias, thereby being a counter electrode to the anodic porous tube. A light source, for example configured as a cylinder, such as the light shown in FIG. 11, may be inserted and reside within the internal cavity of the porous tube of FIG. 9.

The following are non-exhaustive exemplary embodiments.

The porous substrate, which may be a porous tube, may be formed of thermally compressed particles. The electrocatalysts may be loaded or deposited on and/or in the porous substrate by electrodeposition, for example. The electrocatalysts may be electrodeposited on the surface of each particle inside the tube wall. The photocatalysts may be loaded or deposited on and/or in the porous substrate by acid-etching followed by high-temperature annealing, for example. The photocatalysts may be grown, synthesized, or deposited on the surface of each particle inside the tube wall.

The porous titanium tube is fabricated with titanium particles by thermal compressing, on which 5-8 μm of the electrocatalyst is loaded externally and 2-4 μm of the photocatalyst is loaded internally. The pore size distribution is 50 μm-20 μm-10 μm-20 μm-50 μm through thickness. The tube wall thickness is 5 mm. The length of the tube is 300 mm (not including the screw thread interface) and the diameter is 40 mm.

The porous tube was embedded in a stainless-steel case. The outer diameter of the case is 60 mm. The entire length is 330 mm.

Herein, a 254 nm UV-light (parameters as below) was installed in the tube.

Brand: PHILIPS; Power: 8 W; Length: 287 mm; Lifetime: 8000 h; light intensity: 10-15 mW cm$^{-2}$; Luminous Flux (lm): 600; Luminous Efficiency: 79

Example 6: Exemplary Operational Cases and Data of Wastewater Treatment Using Embodiments of Systems and Methods Disclosed Herein This Example is divided into "Cases", each case corresponding to a separate experimental demonstration, and corresponding parameters and data, of wastewater treatment using embodiments of systems and methods disclosed herein. As supported by the examples here, the systems and methods disclosed herein are capable of decontaminating a variety of wastewater types and contaminant types, including, but not limited to, heavy oil, acrylonitrile, urea, uric acid, terephthalic acid, coke wastewater, refining wastewater, high salinity wastewater, and fracturing flow-back fluid. The maximum useful concentration of pollutant is, for example, ca. 300,000 mg/L ($COD_{Cr}$, heavy oil wastewater) and the COD concentration in the outflow is less than 500 mg/L, for example.

Case 1:
Target wastewater: terephthalic acid wastewater
Pilot test results:

| Inflow TOC (mg/L) | Outflow TOC (mg/L) | Retention Time (h) | Current (mA) | Cell voltage (V) | Removal ratio (%) |
|---|---|---|---|---|---|
| 72 | 27 | 1 | 180 | 8 | 62.5% |
| 90 | 33 | 1 | 180 | 8 | 63.3% |
| 66 | 22 | 1 | 180 | 8 | 66.7% |
| 81 | 28 | 1 | 180 | 8 | 65.4% |

| Inflow TOC (mg/L) | Outflow TOC (mg/L) | Retention Time (h) | Current (mA) | Removal ratio (%) |
|---|---|---|---|---|
| 53.76 | 53.76 | 0 | 330 | 0.0 |
| 53.76 | 6.21 | 3.3 | 330 | 88.4 |
| 53.76 | 5.7 | 3.5 | 330 | 89.4 |
| 53.76 | 5.37 | 3.7 | 330 | 90.0 |
| 53.76 | 5.56 | 3.8 | 330 | 89.7 |
| 53.76 | 6.36 | 4.0 | 330 | 88.2 |
| 53.76 | 6.46 | 4.1 | 330 | 88.0 |
| 53.76 | 5.53 | 4.3 | 330 | 89.7 |
| 53.76 | 6.7 | 4.5 | 330 | 87.5 |

*TOC (total organic carbon)

Case 2:
Target wastewater: Reverse osmosis concentrated water
Pilot test results:

| Current and Voltage | Inflow | 15 min 15A, 4.6 V | 30 min |
|---|---|---|---|
| $COD_{Cr}$ (mg/L) | 137 | 34 | 45 |
| Cl$^-$ (mg/L) | 400 | n.d. | 218 |
| Free chlorine (mg/L) | n.d. | 1.02 | 0.72 |
| Br$^-$ (mg/L) | 308 | 808 | 585 |
| $COD_{Cr}$ (mg/L) | 145 | 41 | 26 |
| Cl$^-$ (mg/L) | 332 | 311 | n.d. |
| Free chlorine (mg/L) | n.d. | 0.68 | 0.68 |
| Br$^-$ (mg/L) | 392 | 103 | 464 |

*n.d. (no detectable)

Case 3:
Target wastewater: Power plant wastewater
Pilot test results:

| Retention Time (min) | Current density (mA/cm$^2$) | $COD_{Cr}$ (mg/L) | Cl$^-$ (mg/L) | NH$_4$—N (mg/L) | pH |
|---|---|---|---|---|---|
| 0 | 10 | 88 | 550 | 2.1 | 7.3 |
| 10 | 10 | 62 | 365 | n.d. | 7.1 |
| 20 | 10 | 49 | 277 | n.d. | 7.0 |
| 30 | 10 | 45 | 230 | n.d. | 6.8 |
| 90 | 10 | n.d. | 94.6 | n.d. | 6.5 |
| 120 | 10 | n.d. | 28.4 | n.d. | 6.1 |

Case 4:
Target wastewater: pharmaceutical wastewater
Pilot test results: See FIG. 12.

Case 5:
Target wastewater: Coking wastewater
Water qualities:

| | Parameters | | | | | | | | |
|---|---|---|---|---|---|---|---|---|---|
| pH | COD (mg/L) | $NH_3$—N (mg/L) | $CN^-$ (mg/L) | Volatile Phenol (mg/L) | Conductivity (ms/cm) | Water hardness (mg/L) | Basicity (mg/L) | $Cl^-$ (mg/L) | Total Fe (mg/L) |
| 6.54 | 702 | 1450.2 | 1.06 | 0.87 | 47.22 | 25625.6 | 249.85 | 24566.85 | 1.49 |
| Control standard 6~9 | ≤40 | ≤10 | <0.2 | <0.3 | ≤3000 | ≤450 | ≤350 | ≤300 | ≤0.5 |

Pilot test results:

| Retention time (min) | Current density (mA/cm$^2$) | pH | COD (mg/L) | $NH^3$—N (mg/L) | $Cl^-$ (mg/L) | Energy consmuption (kWh/m$^3$) |
|---|---|---|---|---|---|---|
| 10 | 10 | 6.3 | 612 | 1420 | 23000 | 3.10 |
| 20 | 10 | 5.8 | 346 | 890 | 20000 | 6.20 |
| 30 | 10 | 5.4 | 185 | 600 | 18600 | 9.30 |
| 60 | 10 | 4.7 | <5 | 450 | 12170 | 18.6 |

Case 6:
Target wastewater: Coking wastewater
Water qualities:

| | Parameters | | | | | | | |
|---|---|---|---|---|---|---|---|---|
| pH | COD (mg/L) | $NH_3$—N (mg/L) | $CN^-$ (mg/L) | Volatile Phenol (mg/L) | Conductivity (ms/cm) | Water hardness (mg/L) | Basicity (mg/L) | $Cl^-$ (mg/L) |
| 7.49 | 897.5 | 1.5 | 0.102 | 0.052 | 5870 | 68 | 70 | 1970 |
| Control standard 6~9 | ≤40 | ≤10 | <0.2 | <0.3 | ≤3000 | ≤450 | ≤350 | ≤300 |

Pilot test results:

| Retention time (min) | Current density (mA/cm$^2$) | pH | COD (mg/L) | $NH^3$—N (mg/L) | $Cl^-$ (mg/L) | Energy consmuption (kWh/m$^3$) |
|---|---|---|---|---|---|---|
| 10 | 10 | 6.3 | 127.0 | <0.5 | 1223 | 3.10 |
| 20 | 10 | 6.2 | 14.2 | <0.5 | 1412 | 6.20 |
| 30 | 10 | 5.5 | <5 | <0.5 | 689 | 9.30 |
| 60 | 10 | 4.6 | <5 | <0.5 | 326 | 18.6 |

Case 7:
Target wastewater: refinery wastewater
Processes comparison: See FIG. 13.

Case 8:
Target wastewater: refinery wastewater
Pilot Test Results:

| Retention time (min) | Current density (mA/cm$^2$) | Voltage (V) | COD (mg/L) | $NH^3$—N (mg/L) | $Cl^-$ (mg/L) | Energy consmuption (kWh/m$^3$) |
|---|---|---|---|---|---|---|
| 0 | — | — | 300,000 | 14 | 1660 | — |
| 10 | 10 | 6.8 | 62,000 | <0.5 | 1223 | 14.2 |
| 20 | 10 | 7.2 | 4,200 | <0.5 | 1412 | 28.4 |
| 30 | 10 | 7.9 | 580 | <0.5 | 689 | 42.6 |
| 60 | 10 | 8.0 | 320 | <0.5 | 326 | 85.2 |

Example 7: Concern of Pb Leaching from the Anode Which Might Result in Secondary Environmental Problems One may concern that PbO2 electrode may release $Pb^{2+}$ ions under anodic polarization conditions, resulting in water pollution and some environmental risks. However, in our and other studies, the risk was extremely low. Under the condition of strong acid, the concentration of $Pb^{2+}$ ions released is almost negligible and far below the threshold of drinking water standards by WHO and EPA.

TABLE 4

Pb leach test results reported by previous literature

| Anode | Solvent environment | test time | Current density | Leaching Concentration | Ref. |
|---|---|---|---|---|---|
| PbO$_2$@Ti | 200 g L$^{-1}$ H$_2$SO$_4$ | 30-days | 6.45 to 12.90 A/dm$^2$ | N.D. | [1] |
| βPbO$_2$/Ti | Na$_2$SO$_4$ | CV scan | — | 0.0013 ppm | [2] |
| GβPbO$_2$/Ti | | CV scan | — | 0.0035 mg L$^{-1}$ | [3] |
| Ce—PbO$_2$ | Na$_2$SO$_4$ | 90 min | 20 mA/cm$^2$ | 0.005-0.008 mg L$^{-1}$ | [4] |

* Drinking water ordinance limits of German (0.025 mg L$^{-1}$), WHO (0.01 mg L$^{-1}$), China (0.01 mg L$^{-1}$), and USEPA (0.01 mg L$^{-1}$)

1. Higley, Rolla, M O: U.S. Department of the Interior, Bureau of Mines, RI 8111, 1976 Jan:1-10
2. Dargahi, A.; Nematollahi, D.; Asgari, G.; Shokoohi, R.; Ansari, A.; Samarghandi, M. R. *Rsc Adv* 2018, 8, (69), 39256-39268.
3. Samarghandi, M. R.; Nemattollahi, D.; Asgari, G.; Shokoohi, R.; Ansari, A.; Dargahi, A. *Sep. Sci. Technol.* 2019, 54, (4), 478-493.
4. Niu, J.; Lin, H.; Xu, J.; Wu, H.; Li, Y. *Environ. Sci. Technol.* 2012, 46, (18), 10191-10198.

Example 8: Exemplary System Configurations

See FIGS. 14-18.

Example 9: The Differences Between Systems and Methods Herein and US2020/0407248

Example 10: Advantages of Large-Small-Large Pore Size Distribution

The use of a large-small-large pore size distribution within the porous substrate, such as across a porous tube, provides a variety of unexpected benefits.

A large-small-large pore size distribution facilitates coating of the photocatalysts and electrocatalysts. Firstly, the porous titanium tube is soaked in an acid solution to etch the oxide layer on their surface. Then the photocatalysts and electrocatalysts are deposited/cultured/coated on the surface of the pores with their precursor solutions by anodic oxidation. Finally, the as-prepared porous tube is annealed in a muffle furnace for the crystallization of the photocatalysts and electrocatalysts. Here, the large-small-large distribution is beneficial to the mass transfer of the acid solution (acid-etching) and the precursor solution (electrocatalyst deposition and photocatalyst growth). In other words, the open porous structure makes the deposition/growth/coating easier. In addition, the gas (usually $CO_2$ and $NO_x$ from the dissociation of precursors) generated during the annealing process is also easy to be released from the pores.

A large-small-large pore size distribution facilitates or enhances in-drafting oxygen bubbles generated in the system. During an electrolytic reaction, the oxygen bubbles are produced intensively and finely, and easy to adsorb on the outer surface of the porous tube. If the pore size distribution is homogeneous from the outside to the inside, the oxygen

| | Example Other Art | Here |
|---|---|---|
| Objective | A pure electrocatalytic process designed to enhance mass transfer during an electrocatalytic reaction | A hybrid process including electrocatalytic, photocatalytic, photolytic, and confined reaction |
| Support | titanium foam, titanium mesh, titanium fibers | Porous tube by thermos compressing conductive particles |
| Active layer | ATO/NATO or Ir—Ru—Ti—O | Doped PbO$_2$ |
| Pore size | 50 μm to 100 μm | <10 μm inside of the tube |
| Lifetime | <2000 h | >80000 h |
| Active species | hydroxyl radicals, chlorine, reactive chlorine species, reactive oxygen species, and ozone | hydroxyl radicals |
| Flow direction | Inflow or outflow; either direction has no effect on the performance | Inflow; to maximize the life time of the hydroxyl radicals |
| Target contaminants | ammonium ions, one or more pharmaceuticals, one or more personal care products (PPCP), bacteria, virus, perfluorinated alkyl substances, polyfluorinated alkyl substances | Includes all of US2020/0407248, and heavy oil, acrylonitrile, urea, uric acid, terephthalic acid, coke wastewater, refining wastewater, high salinity wastewater, fracturing flow-back fluid, etc. | bubbles are difficult to be smuggled in the pores with the water stream. The large-small-large pore size distribution are more convenient for bubbles compressed and then draft into the pores.

In general, porous materials are approximated as parallel channels to facilitate modeling and analysis. However, if the parallel pore distribution of this structure is adopted, oxygen bubbles will not be further compressed when entering the pore, and active species such as hydroxyl radicals enfolded within the pore will not have the opportunity to get close contact with the pollutants. Therefore, embodiments of systems disclosed herein comprise a large-small-large pore size distribution. In the process of flow through the channel and then shrinking aperture, the larger oxygen bubbles are gradually compressed into smaller bubbles, the spherical bubbles are stretched into elongated elliptic bubbles, so that a gas-liquid interface is constructed between the oxygen bubbles and water film on the surface of the pores. The interface limits the reaction to occur in a micron's thick area. Herein, the water film on the pore walls is extremely thin and the oxygen bubbles are compressed to a very small size, which allow sufficient mass transfer of reactive oxygen species (hydroxyl radicals) and contaminants at the gas-liquid interface, thus enhancing the efficiency of the oxidization of contaminants.

For example, the average characterize pore or microchannel size or characteristic pore diameter at or near each external surface of the porous substrate is selected from the range of about 20 µm to about 50 µm. For example, the average characterize pore or microchannel size or characteristic pore diameter in a middle region of the porous substrate is less than 10 µm. Generally, but not necessarily, the large-small-large pore size distribution is generated during formation of the porous substrate. Optionally, deposition of the catalytic materials may further affect the pore size distribution. For example, the large-small-large pore size distribution comprises or is characterized by the average characterize pore or microchannel size or characteristic pore diameter transitioning from about 50 µm at/near the first external surface, to about 20 µm toward the middle, to about 10 µm in the middle region, to about 20 µm again toward the second external surface, to about 50 µm again near/at the second external surface. The transition between the different pore sizes is generally, though not necessarily, quantitatively smooth and not abrupt. For example, the thickness of the pore substrate may be selected from the range of about 3 to about 10 mm.

Example 11: Exemplary Considerations and Embodiments Pertaining to Oxygen Bubbles In-Drafting and the "Indraft-Compression-Swell" Process In the relevant fields, generation of oxygen bubbles and the OER (oxygen evolution reaction) are generally considered disadvantageous or adverse processes. Generation of oxygen bubbles has not been previously viewed or utilized for boosting the reaction activity of an electrocatalytic process. For example, factors that influence the generally agreed-upon undesirability of oxygen bubbles or the OER in electrocatalytic processes include: OER is the most important consecutive-competitive reaction for the electrocatalytic destroy of organic contaminants; OER will consume electrical energy but yield useless oxygen; oxygen bubbles will cover the surface of the anodes and cut off the contact between anode and the electrolyte, not only preventing the mass transfer of the contaminants, but also increasing liquid junction potential and raise power consumption.

In the systems and methods disclosed herein, however, make the OER and generation of oxygen bubbles advantageous because the systems and methods provide for oxygen bubbles to be drafted into the pores of the porous substrate (e.g., a porous tube wall), protecting the hydroxyl radicals from self-quenching, removing the bubbles from the surface of the anodes, optimizing the local electric field conditions, and lowering the power consumption.

The large-small-large pore size distribution in the internal porous region facilitates an indraft-compression-swell process of the generated and flowing oxygen bubbles. A high flow rate of wastewater also facilitates generated oxygen bubble indrafting into the pores of the porous substrate, as soon as they are created on the surface of the anodes, for example.

Factors that may influence whether and how well generated oxygen bubbles are in-drafted into the pores or channels include: hydrostatic pressure, dynamic pressure, solubility of oxygen in water, oxygen bubble surface tension, pore size distribution, surface hydrophobicity of electrocatalyst, etc. Among them, the dynamic pressure, solubility of oxygen, surface tension, and surface hydrophobicity are generally constant, or controlled by external factors which are difficult to change. Therefore, the hydroxyl radical concentration was investigated as a function of hydrostatic pressure under the different pore size distribution as shown in FIG. 19.

FIG. 19 shows concentration of generated hydroxyl radicals in an exemplary wastewater treatment system, according to embodiments here, as a function of hydrostatic pressure for different pore size distributions in the internal porous region of the porous substrate. In the particular case of FIG. 19, probe molecules were used to measure the concentration of hydroxyl radicals in water. Specifically, excessive hydroxyl radical probes were added into the reaction solution in advance, and indirectly measured the steady-state concentration of hydroxyl radical in water by the consumption of probe molecules at the interval times. Therefore, the concentration of hydroxyl free radicals in FIG. 19 reflects the total concentration of free radicals in the entire system, including the free radicals in the porous tube, in the downstream and even in the water outlet, and corresponds to the hydroxyl free radical yield of the system.

While the exact concentration of hydroxyl radicals exiting the porous substrate may vary depending on specific configurational features of the system, compositions of catalytic materials, anodic bias, light luminance, etc., FIG. 19 shows an effect of hydrostatic pressure and pore size distribution on hydroxyl radical concentration when all other facts are taken as constant. It is noted that the hydrostatic pressure of the system was controlled and measured by a counterbalance valve equipped with a digit-display manometer. As shown in FIG. 19, with the increase of hydrostatic pressure, the yield of hydroxyl radicals increases significantly, leading to an increase in the concentration of the oxygen bubbles in the outflow. This phenomenon is most obvious at the pore size distribution of 50-20-10-20-50 µm and 20-10-20 µm. Especially for 50-20-10-20-50 µm, the hydroxyl radical concentration is as high as 227 µmol/L which is much higher than that generated by the strongest BDD electrocatalytic system. However, when the hydrostatic pressure goes up to 0.3 Mpa, the concentration of hydroxyl radicals goes down. It can be explained that the oxygen bubbles dissolve in water at high pressure (>0.35 MPa), causing the flow through the channels to be in the liquid phase only rather than a mixture of gas and liquid. In fact, this phenomenon is no different from the traditional electrocatalytic process. Hydroxyl radicals tend to collide and quench each other in the liquid phase, resulting in a low yield of hydroxyl radicals at the outflow. FIG. 19 demonstrate the advantages of a large-small-large pore distribution, compared to uniform pore size distribution and a small-large-small distribution, with respect to increased hydroxyl radical concentration and particularly with respect to facilitating the in-draft and passage of generated oxygen bubbles through the porous region, which in turn facilitates higher hydroxyl radical concentrations.

A 5× difference in pore size between large and small pores, for example, provides beneficial results. Optionally, the average pore size or characteristic pore diameter of the large pores, in a large-small-large pore size distribution, is greater than the average pore size or characteristic pore diameter of the small pores by a factor of at least 2, optionally by a factor of at least 3, optionally by a factor of at least 4, optionally by a factor of at least 5, optionally by a factor of at least 6, optionally by a factor of at least 7, optionally by a factor of at least 8, optionally by a factor of at least 9, optionally by a factor of at least 10, optionally by a factor selected from the range of 2 to 10, optionally by a factor selected from the range of 2 to 50. For example, the pore size distribution, 50-20-10-20-50 µm (in terms of average the average pore size or characteristic pore diameter) shows a significant advantage. The data also supports that hydrostatic pressure is a very important controlling factor, wherein the highest yield of hydroxyl radical being achieved at moderate hydrostatic pressure.

The generated oxygen bubbles may undergo "indraft-compression-swell" process in the systems and methods disclosed herein. First, oxygen bubbles that are electrocatalytically and/or photocatalytically generated preferably flow into or further through (indraft), with respect to where they are first generated, the porous internal region. For example, bubbles generated at a first external surface will be drafted into or flow into and through at least a portion of the porous internal region. Preferably, a majority of generated oxygen bubbles through entirely through the porous internal region between the point of first generation and the downstream external surface (e.g., the second external surface) without bursting. For example, optionally, a majority of oxygen bubbles generated at the first external surface or within the large pores nearest to the first external surface will flow through the internal porous region intact (without bursting) to the second external surface. As oxygen bubbles pass from large pores or microchannels to smaller pores or microchannels, the oxygen bubbles are compressed. As oxygen bubbles pass through the small pores or microchannels into the larger pores or microchannels, the oxygen bubbles swell.

Traditional electrocatalytic reactions use planar electrodes, where electrooxidation reaction only occurs on the electrode plane, and the reaction area is very limited. As a result, the density of hydroxyl radicals is too high, which is easy to quench each other, and the actual available efficiency of hydroxyl radicals is quite low. On the other hand, oxygen bubbles produced by electrooxidizing water are unwanted byproducts, resulting in reduced energy efficiency. At the same time, oxygen bubbles can also adsorb onto the active sites covering the electrode surface, further reducing the electrocatalytic efficiency. Therefore, a key to improve the efficiency of an electrocatalytic process is to increase the lifetime and diffusion range of hydroxyl radicals and eliminate the negative effects of oxygen bubbles. For example, see illustrations in FIGS. 3-5.

With the above limitations of traditional systems in mind, the systems and methods disclosed herein address these limitations by providing an "indraft-compression-swell" process for the oxygen bubbles, where bubbles undergoing this process may be referred to herein as the "super bubbles". The development of these systems and methods is informed by some fundamental theories: the much longer half-life of hydroxyl radicals in air (>1 s vs. $10^{-10}$-$10^{-9}$ s in aqueous environment); the confined effect can enhance the mass transfer of pollutants and free radicals on the gas-liquid interface; under a certain external pressure, oxygen bubbles can be entrained by water flowing through micro pores.

When applying a certain hydraulic pressure on the outside of the porous electro-photo tube (PEOT) to pump the wastewater through the channels from the outside to the inside, hydroxyl radicals, by-product oxygen bubbles and a small amount of ozone are entrained into the microchannels with a diameter of several micrometers during the electrocatalysis process. The hydroxyl radicals in the water are squeezed by a large number of microbubbles close to the pore wall. There are tens to hundreds of nanometer diffusion layers for hydroxyl radicals, which can be in full contact with organic pollutants. The first half of the microchannels also have electrocatalytic activity, which can continuously replenish hydroxyl radicals consumed by quenching. In addition, with the consumption of organic pollutants in water, the concentration of hydroxyl radicals in the diffusion layer is constantly increasing. These large amounts of remaining hydroxyl radicals can diffuse and be stored in the bubbles in the microchannels. For example, see illustrations in FIGS. 3-5.

To achieve the above purposes, the "indraft-compression-swell" process is of crucial importance. The oxygen bubbles can be "indrafted" to the designed distribution of pores; then the bubbles are "compressed" and slotted, which is good for the interfacial reaction. The "swelling" process is a natural process of stress release. Photocatalysis generates hydroxyl radicals as the bubble reaches the photocatalytic section, and the replenished hydroxyl radicals can continue to oxidize pollutants.

Example 12: Additional Exemplary Considerations and Embodiments Pertaining to Oxygen Bubbles Preferably, but not necessarily, bursting of generate oxygen bubbles substantially only occurs at a surface layer of the wastewater which will result in loss of the hydroxyl radicals. Considering that, it is generally preferred to maintain more small oxygen bubbles in the wastewater. The reason can be explained as the following. Theoretically, the energy consumption of bubble formation depends on the liquid-gas interfacial area, which is determined by the bubble surface tension. Small bubbles with a diameter of less than 25 µm have strong surface rigidity, similar to high-pressure balloons, and are not easy to burst. Large bubbles, a few millimeters in diameter, have a soft surface and are prone to deformation and rupture. Large bubbles are buoyant and rise to the surface easily. According to the Stokes formula, the bubble rise velocity can be calculated. The rise velocity on the bubble is proportional to the square of the bubble diameter, and this relationship only applies to small bubbles. For bubbles larger than 2 mm in diameter, the rise velocity will not be affected by the diameter due to the change in its shape. Small bubbles below 1 micron rise very slowly, much slower than Brownian motion, and may be approximated as being stationary compared to large bubbles. Small bubbles also have strong electrostatic field, which can avoid bubble fusion and resist buoyancy. An extreme case, Seung Hoon Oh et al. analyzed the bubbles in hydrogen gasoline and found that the life of hydrogen small bubbles could be stable for 121 days. Generally, the small bubbles will survive in a solution from 10 s to 15 min.

The sizes of the bubbles generated on the surface of the porous anodes are mainly a few to tens of micrometers, however, they contribute almost nothing to destroy the contaminants, because 1) they are not a reservoir for hydroxyl radicals; 2) they are easy to conglomerate with each other and grow rapidly, and rise to the top of the water, then burst. On the other hand, if the bubbles can be drafted into the pores as soon as they are created, they will remain as reservoirs for hydroxyl radicals and protect them from liquid water. Those hydroxyl radicals can transport to the gas-liquid interface at any moment and react with the contaminants adsorbed on the small bubbles.

It is preferable for some embodiments for the oxygen bubbles in the porous internal region to be characterized by an average size or characteristic diameter selected from the range of 0.1 to 10 μm. It is preferable for some embodiments for the oxygen bubbles in the porous internal region to be characterized by residence times selected from the range of 10 seconds to 15 minutes, for example, depending on the solution conditions, the pore sizes, catalyst composition, voltage as well as the solution/wastewater conditions.

Example 13: Flow Rate Calculations

For example, the volume of reaction tube is about 300 mL. In order to ensure that hydrogen and oxygen generated by the electrolytic reaction can be discharged smoothly, the reaction tube is filled within 30 s to 20 min. Thus, the calculated flow rate is about 15-600 mL/min, that is, 2.5× $10^{-7}$ m$^3$/s-1×$10^{-5}$ m$^3$/s (Q), and the length of the porous tube is 300 mm. The diameter is 40 mm, the thickness is 5 mm, and the water area is 0.06-0.09 m$^2$ (A) based on the porosity of 25% on the tube (the porosity varies in different areas, is ca. 25-40%). Therefore, considering the equation: V=Q/A, the linear velocity is 2.6×$10^{-5}$ m/s-1.1×$10^{-3}$ m/s, and the residence time of wastewater in the tube wall is 4.7-188 s, which ensures sufficient reaction time for the oxidation reaction of wastewater under the attack of hydroxyl radical.

Example 14: Additional Exemplary Considerations and Embodiments Pertaining to the Photocatalytic Material An exemplary photocatalytic material is defective titanium dioxide nanobamboo (or nanotube) arrays (DTiO$_2$ NBAs), such as shown in FIG. 18. In exemplary fabrication embodiments, porous titanium tubes may be as substrates for TiO$_2$ nano-architecture growth, which were cleaned by ultrasonication in acetone, ethanol, followed by rinsing with deionized (DI) water. The anodization experiment was carried out in an electrochemical reaction cell at a pulse potential (duty ratio 0.1) of 40 V for 4 h with 20 mm separation distance between the anode (titanium foils) and cathode (platinum sheet). The electrolyte include NH$_4$F (0.3 wt %), ethylene glycol (95 vol %), and DI water (5 vol %). After anodization, the sample was rinsed with ethanol and DI water with low ultrasonic power successively, and then dried in argon. To obtain anatase crystals TiO$_2$ nanobamboo arrays (ATiO$_2$ NBAs), the as-anodized sample was further annealed in a muffle furnace at 450° C. for 2 h with a heating rate of 4° C. min$^{-1}$. The DTiO$_2$ NBAs were synthesized by the electrochemical reduction of ATiO$_2$ NBAs in a two-electrode cell (platinum sheet as counter electrode and the sample as work cathode) at room temperature. The electrolyte included of 200 mL of ethylene glycol and 10 mL of 1 mol L$^{-1}$ Na$_2$SO$_4$ aqueous solution. A cathodic voltage of 6 V was then applied to the samples for 30 s. After electrochemical reduction, the samples were rinsed with DI water and dried with flowing argon. The oxygen vacancies (O$_{vac}$) on the surface of TiO$_2$ nanobamboo are easily annihilated by adsorbed oxygen. In order to tune the defects concentration of the samples, the electrochemical reduction process was repeated three times.

In certain embodiments disclosed herein, the photocatalytic material comprises one or more metal and/or nonmetal oxide materials. In certain embodiments disclosed herein, the atomic structure or arrangement of the photocatalytic material comprises oxygen vacancies.

The photocatalytic material significantly increases performance of the wastewater systems disclosed herein. For example, it was found that in the absence of the photocatalytic process (light-off), the contaminant removal efficiency decreased considerably. For example, when treating the landfill leachate (COD$_{Cr}$ 3000 mg/L, NH3—N 700 mg/L), with the UV-light off, the purified water was still turbid and the COD$_{Cr}$ was 1200 mg/L, NH3—N 124 mg/L; with the UV-light on, the outflow was clear, and the COD$_{Cr}$ was 120 mg/L, NH3—N 82 mg/L.

Data suggests that hydroxyl radicals are generated photocatalytically when the photocatalytic material is present. The increase in concentration of hydroxyl radicals is 10%-15% in the aqueous solutions, and 20-30% in the oxygen bubbles, compared to when using an electrocatalytic material only in the equivalent system. In addition, it is believed that the UV-light plays a key role in the direct photolysis of some organics. Some persistent organic matter may be decomposed by the strong UV-light irradiation. More importantly, the electrocatalytic and photocatalytic reactions both occur in confined spaces, for example, the micrometer sized oxygen bubbles, the micrometer porous channel, and the interfaces between the air/solid and the liquid. The confinement effect can amplify the efficiency of the treatment process by hundreds of times.

Example 15: Theoretical Service Life

"Theoretical service life", such as of an electrode, catalytic material, system, or a combination of these, can be determined experimentally. For example, a porous substrate, according to embodiments here, can be analyzed as an electrode (e.g., anode). For example, theoretical service life was investigated by accelerated lifetime test with a current density of 800 mA cm$^{-2}$ in 3 mol L$^{-1}$ H$_2$SO$_4$ solution. Temperature of a sulfuric acid solution was kept at 45° C.±2° C. by the electrical resistance heating. During the accelerated lifetime test, the cell voltage was measured automatically by the electrochemical workstation and the test was considered finished when the cell voltage was higher than 16 V (double of the initial voltage).

There is an empirical equation describing the relationship between the electrode life and the test environment (*Electroanalysis* 2020, 32, 1370-1378):

$$L \sim 1/i^n \qquad (1)$$

where "L" is the electrode life; "I" is the current density; "n" is a coefficient, and i$^n$ represents the severity of the electrode's serving environment. Therefore, according to Equation (1), the calculated life of the electrode in the actual environment is:

$$CL = AL/8760 \times (i_{AL}/i_{CL})^n \qquad (2)$$

where "CL" is the theoretical service life of the electrode (year), "AL" is the accelerated life of the electrode (h); "$i_{AL}$" is the acceleration test current density (A/m$^2$); "$i_{CL}$" is the current density used under actual conditions. The value of n ranges from 1.4 to 2.0 depending on test condition. The harsher the test condition is, the larger the value of n is. In our case, the value of n is 2. A DC power supply may be used during the measurements. For example, the acceleration lifetime of porous anode was measured to be ca. 182 h (e.g., see FIG. 20). In many applications, the current density applied on the porous anode are less than 20 mA cm$^{-2}$. Then the CL can be calculated to be 33.2 year according to the equation (2) above.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Every system, component, combination of components, feature, and method described or exemplified herein can be used to practice the invention, unless otherwise stated.

Whenever a range is given in the specification, for example, a size range, all intermediate ranges and subranges, as well as all individual values included in the ranges given are expressly intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A wastewater treatment system comprising:
a porous substrate having a first external surface, a second external surface opposite the first external surface, and an internal porous region between the first external surface and the second external surface; wherein
the porous substrate is an anode;
an electrocatalytic material immobilized on at least a portion of the first external surface and/or in at least a portion of the internal porous region;
wherein
the porous substrate and the electrocatalytic material are in electrical communication; and
the porous substrate is configured to be subjected to an anodic bias sufficient to electrocatalytically generate hydroxyl radicals at the electrocatalytic material;
a photocatalytic material immobilized on at least a portion of the second external surface and/or in at least a portion of the internal porous region;
a light source positioned to expose at least a portion of the photocatalytic material to a light sufficient to photocatalytically generate hydroxyl radicals at the photocatalytic material;
wherein:
the wastewater treatment system is configured to receive a flow of wastewater between the first external surface and the second external surface through the internal porous region such that the flow of wastewater is at least partially in contact with the electrocatalytic material and the photocatalytic material;
the wastewater treatment system is configured to decrease a concentration of contaminants in the flow of wastewater at least via an interaction between the contaminants and the hydroxyl radicals; and
application of the anodic bias to the porous substrate generates oxygen bubbles at the electrocatalytic material; and/or
exposure of the photocatalytic material to the light generates oxygen bubbles at the photocatalytic material.

2. The system of claim 1, wherein the internal porous region comprises:
a first internal region nearest to the first external surface, a second internal region nearest to the second external surface, and a middle internal region between the first and second internal regions; and
wherein the middle internal region is characterized by a different average pore size relative to an average pore size in each of the first internal region and the second internal region.

3. The system of claim 2, wherein the internal porous region is characterized by a non-linear pore size distribution; wherein an average pore size in the middle internal region is less than an average pore size in each of the first internal region and the second internal region.

4. The system of claim 2, wherein the average pore size in the first internal region is selected from the range of 20 μm to 50 μm, the average pore size in the middle internal region is selected from the range of 20 μm to 1 μm, and the average pore size in the second internal region is selected from the range of 20 μm to 50 μm.

5. The system of claim 1, wherein at least 80% of the total surface area of the internal porous region comprises the electrocatalytic material and/or the photocatalytic material operably immobilized thereon.

6. The system of claim 1, wherein at least a portion of the electrocatalytic material is subject to the anodic bias selected from the range of 1.8 V to 4.5 V vs. Ag/AgCl.

7. The system of claim 1, wherein the system further comprises a cathode; and wherein the system comprises an overall potential between the anode and the cathode selected from the range of 3 V to 12 V.

8. The system of claim 1, wherein the electrocatalytic material is characterized by an oxygen evolution potential (OEP) selected from the range of 1.6 to 2.3 V vs. SHE.

9. The system of claim 1, wherein the electrocatalytic material comprises Pt, $PbO_2$, boron-doped diamond, or a combination of these.

10. The system of claim 1, wherein the photocatalytic material comprises titanium dioxide, ZnO, $Bi_2O_3$, $Cu_2O$, $SrTiO_3$, or any combination of these.

11. The system of claim 1, wherein the photocatalytic material is nanostructured.

12. The system of claim 1, wherein the photocatalytic material is characterized by a band gap selected from the range of 2.4 to 6.7 eV.

13. The system of claim 1, wherein oxygen bubbles flowing within the internal porous region are characterized by an average characteristic size selected from the range of 0.1 μm to 10 μm.

14. The system of claim 1, wherein a majority of oxygen bubbles that are generated within or that enter the internal porous region remain intact when within the internal porous region.

15. The system of claim 1, wherein the oxygen bubbles within the internal porous region comprise hydroxyl radicals within each bubble's gas-phase.

16. The system of claim 1, wherein the oxygen bubbles flow through pores of the internal porous region thereby confining a liquid layer adjacent to a nearest pore surface to a thickness of less than 1 μm; and wherein a liquid layer between each oxygen bubble flowing within the internal porous region and a nearest surface of the internal porous region has thickness of less than 1 μm.

17. The system of claim 1, wherein at least a fraction of oxygen bubbles generated outside the internal porous region are indrafted into the internal porous region.

18. The system of claim 1, wherein oxygen bubbles within the internal porous region compress when flowing from pores nearer to the first or second external surface to pores in a middle region of the internal porous region; and wherein oxygen bubbles within the internal porous region swell when flowing from pores in a middle region of the internal porous region to pores nearer to the first or second external surface.

19. The system of claim 1, wherein the flowrate of the wastewater near the first external surface, in the internal porous region, and/or near the second external surface is selected from the range of $2.6 \times 10^{-5}$ m/s to $1.1 \times 10^{-3}$ m/s.

20. The system of claim 1, wherein the wastewater is characterized by a fluid pressure difference between the first external surface and the second external surface selected from the range of 5.2 Pa to 83 Pa and/or wherein the wastewater is characterized by a fluid pressure at the first external surface selected from the range of 0.05 MPa to 0.3 MPa.

21. The system of claim 1, wherein the hydroxyl radicals are electrocatalytically and/or photocatalytically generated continuously throughout the internal porous region between the first external surface and the second external surface.

22. The system of claim 1, wherein the interaction between the contaminants and the hydroxyl radicals comprises oxidation, decomposition, and/or deactivation of the contaminants.

23. The system of claim 1, wherein the wastewater entering the system and prior to encountering generated hydroxyl radicals is an initial wastewater and wherein the wastewater exiting the system after flowing through the internal porous region is a treated water; and wherein the treated water comprises a lower concentration of one or more contaminants compared to the concentration of the same one or more contaminants in the initial wastewater; wherein the system is characterized by a $COD_{cr}$ selected from the range of 300,000 mg/L to 88 mg/L, and wherein the treated water is characterized by a chemical oxygen demand (COD) of less than 500 mg/L.

24. The system of claim 1, being characterized by a removal ratio for total organic carbon selected from the range of 50% to at least 99.9% after a retention time selected from the range of 1 to 5 hours; and wherein the system is characterized by a contaminant bond energy threshold as high as 485 KJ $mol^{-1}$, a decomposition efficiency of a refractory pollutant of as high as 99.9% depending on the energy utilization efficiency of 0.2-30 $kWh/m^3$, and/or a theoretical service life of the electrode selected from the range of 1 year to 30 years.

25. The system of claim 23, wherein the one or more contaminants comprises ammonium ions, one or more pharmaceuticals, one or more personal care products (PPCP), pathogens, perfluorinated alkyl substances, polyfluorinated alkyl substances, trimethoprim, ciprofloxacin, metoprolol, propranolol, carbamazepine, ammonium ions, heavy oil, acrylonitrile, urea, uric acid, terephthalic acid, coke wastewater, refining wastewater, high salinity wastewater, fracturing flow-back fluid, or any combination of these; and wherein the system is capable of oxidizing, removing, decomposing, or deactivating:

perfluorinated alkyl substances, polyfluorinated alkyl substances, *E. coli.*, MS2 biophage, trimethoprim, ciprofloxacin, metoprolol, propranolol, carbamazepine, ammonium ions, chemical oxygen demand (COD), pharmaceuticals, personal care products (PPCP), heavy oil, acrylonitrile, urea, uric acid, terephthalic acid, coke wastewater, refining wastewater, high salinity wastewater, fracturing flow-back fluid, or any combination of these.

26. The system of claim 1, wherein the porous substrate comprises or is formed of particles; and wherein at least a portion of the electrocatalytic material and at least a portion of the photocatalytic material are immobilized on the particles of the porous substrate.

27. A method for wastewater treatment, the method comprising:
flowing a wastewater having an initial concentration of one or more contaminants into a wastewater treatment system;
treating the initial wastewater in the system to produce a treated water having a final concentration of the one or more contaminants; wherein the final concentration is less than the initial concentration; and
removing the treated water from the system;
wherein the system comprises:
a porous substrate having a first external surface, a second external surface opposite the first external surface, and an internal porous region between the first external surface and the second external surface;
wherein the porous substrate is an anode;
an electrocatalytic material immobilized on at least a portion of the first external surface and/or in at least a portion of the internal porous region; wherein
the porous substrate and the electrocatalytic material are in electrical communication; and
the porous substrate is configured to be subjected to an anodic bias sufficient to electrocatalytically generate hydroxyl radicals at the electrocatalytic material;
a photocatalytic material immobilized on at least a portion of the second external surface and/or in at least a portion of the internal porous region; and
a light source positioned to expose at least a portion of the photocatalytic material to a light sufficient to photocatalytically generate hydroxyl radicals at the photocatalytic material;
wherein:
the wastewater treatment system is configured to receive a flow of wastewater between the first external surface and the second external surface through the internal porous region such that the flow of wastewater is at least partially in contact with the electrocatalytic material and the photocatalytic material;
the wastewater treatment system is configured to decrease a concentration of contaminants in the flow of wastewater at least via an interaction between the contaminants and the hydroxyl radicals; and
application of the anodic bias to the porous substrate generates oxygen bubbles at the electrocatalytic material; and/or
exposure of the photocatalytic material to the light generates oxygen bubbles at the photocatalytic material;
wherein:
the wastewater flowing in the internal porous region comprises oxygen bubbles and hydroxyl radicals;
wherein the step of treating comprises:
electrocatalytically generating at least a portion of the hydroxyl radicals in the wastewater by subjecting the electrocatalytic material to an anodic bias sufficient to electrocatalytically generate hydroxyl radicals;
photocatalytically generating at least a portion of the hydroxyl radicals in the wastewater by exposing at least a portion of the photocatalytic material a light sufficient to photocatalytically generate hydroxyl radicals;
generating at least a portion of the oxygen bubbles in the wastewater at the electrocatalytic material and/or at the photocatalytic material; and
reducing the concentration of the one or more contaminants from the initial concentration to the final concentration at least via an interaction between the one or more contaminants and the hydroxyl radicals.

* * * * *